(12) United States Patent
Kim et al.

(10) Patent No.: US 11,144,148 B2
(45) Date of Patent: Oct. 12, 2021

(54) TOUCHSCREEN DISPLAY DEVICE, TOUCH DRIVING CIRCUIT AND PEN TOUCH SENSING METHOD

(71) Applicant: LG Display Co., Ltd., Seoul (KR)

(72) Inventors: HoonBae Kim, Seoul (KR); SungChul Kim, Gyeonggi-do (KR); SunYeop Kim, Seoul (KR); Seongkyu Kang, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/881,877

(22) Filed: May 22, 2020

(65) Prior Publication Data
US 2020/0393926 A1 Dec. 17, 2020

(30) Foreign Application Priority Data
Jun. 11, 2019 (KR) .......................... 10-2019-0068916

(51) Int. Cl.
G06F 3/041 (2006.01)
G06F 3/047 (2006.01)
G06F 3/044 (2006.01)

(52) U.S. Cl.
CPC ............ *G06F 3/0412* (2013.01); *G06F 3/047* (2013.01); *G06F 3/0441* (2019.05); *G06F 3/0445* (2019.05); *G06F 3/04162* (2019.05)

(58) Field of Classification Search
CPC .... G06F 3/0441; G06F 3/0412; G06F 3/0445; G06F 3/04162; G06F 3/047
See application file for complete search history.

(56) References Cited

U.S. PATENT DOCUMENTS 5,357,266 A * 10/1994 Tagawa ................. G06F 3/0441
345/173

* cited by examiner

*Primary Examiner* — Lisa S Landis
(74) *Attorney, Agent, or Firm* — Polsinelli PC

(57) ABSTRACT

Provided are a touchscreen display device, a touch driving circuit, and a pen touch sensing method. Sensing processing on a pen signal is performed in a different manner, depending on whether or not a gate line, through which a gate signal having a variable voltage is applied, overlaps with a common electrode selected as a sensing target. Even in the case in which an abnormal noise voltage is induced in the common electrode by panel interior noise while pen touch sensing is being performed during display driving, pen touch sensitivity is prevented from being reduced.

20 Claims, 27 Drawing Sheets

TDC

TOUCHSCREEN DISPLAY DEVICE, TOUCH DRIVING CIRCUIT AND PEN TOUCH SENSING METHOD

CROSS REFERENCE TO RELATED APPLICATION

This application claims priority from Korean Patent Application No. 10-2019-0068916, filed on Jun. 11, 2019, which is hereby incorporated by reference in its entirety.

BACKGROUND

Field of the Disclosure

The present disclosure relates to a touchscreen display device, a touch driving circuit, and a pen touch sensing method.

Description of the Background

Along with the development of the information society, demand for a variety of types of display devices for displaying images is increasing. In this regard, a range of display devices, such as liquid crystal display (LCD) devices and organic light-emitting diode (OLED) display devices, have recently come into widespread use.

In addition, touchscreen display devices providing touch-based user interfaces enabling users to intuitively and conveniently input data or instructions directly to devices, rather than using conventional data input systems, such as buttons, a keyboard, or a mouse, are used.

In addition, in response to increasing demand for a pen touch input in addition to a finger touch input, the development of pen touch technology has been undertaken. However, it may be significantly difficult to efficiently provide a finger touch function and a pen touch function together.

SUMMARY

The present disclosure provides a touchscreen display device, a touch driving circuit, and a pen touch sensing method capable of detecting a pen touch simultaneously with display driving.

The present disclosure provides a touchscreen display device, a touch driving circuit, and a pen touch sensing method able to remove or reduce panel interior noise.

According to an aspect, the present disclosure provides a touchscreen display device including: a display panel including a plurality of data lines, a plurality of gate lines, and a plurality of common electrodes, wherein each common electrode among the plurality of common electrodes overlaps with one or more data lines among the plurality of data lines and one or more gate lines among the plurality of gate lines; and a touch driving circuit, wherein, during a pen touch sensing period simultaneous with display driving, the touch driving circuit drives all or some of the plurality of common electrodes, receives a pen signal output from a pen through a target common electrode selected as a sensing target from among the plurality of common electrodes, performs sensing processing on the pen signal in a different manner, depending on whether or not a gate line through which a gate signal having a variable voltage is applied, from among the plurality of gate lines, overlaps with the target common electrode, and generates and outputs sensing data according to a result of the sensing processing.

The touch driving circuit may perform the sensing processing on signal segments of the pen signal or skip the sensing processing on some signal segments of the pen signal while performing the sensing processing on remaining signal segments of the pen signal, depending on whether or not the gate line through which the gate signal having a variable voltage is applied overlaps with the target common electrode.

The touch driving circuit may perform the sensing processing on all of a plurality of pulses of the pen signal or skip the sensing processing on at least one pulse of the pen signal while performing the sensing processing on remaining pulses of pulses of the pen signal, depending on whether or not the gate line through which the gate signal having a variable voltage is applied overlaps with the target common electrode.

The touch driving circuit may perform the sensing processing on the remaining signal segments among the signal segments of the pen signal in a case in which the gate line through which the gate signal having a variable voltage is applied overlaps with the target common electrode.

The touch driving circuit may perform the sensing processing on the signal segments of the pen signal in a case in which the gate line through which the gate signal having a variable voltage is applied does not overlap with the target common electrode.

According to another aspect, the present disclosure provides a touch driving circuit including: a sensing circuit, wherein, during a pen touch sensing period simultaneous with display driving, the sensing circuit drives all or some of the plurality of common electrodes, receives a pen signal output from a pen through a target common electrode selected as a sensing target from among the plurality of common electrodes, and performs sensing processing on the pen signal in a different manner, depending on whether or not a gate line through which a gate signal having a variable voltage is applied, from among the plurality of gate lines, overlaps with the target common electrode; and an output circuit generating and outputting sensing data according to a result of the sensing processing.

The sensing circuit may include: an operation amplifier including a first input port electrically connected to the target common electrode, a second input port through which a reference voltage is input, and an output port through which an output signal is output; a capacitor electrically connected to the first input port and the output port; and a reset switch controlling a connection between the first input port and the output port.

The sensing circuit may perform sensing processing on all of signal segments of the pen signal or skip the sensing processing on some of the signal segments of the pen signal while performing the sensing processing on remaining signal segments of the pen signal, depending on whether the reset switch is on or off.

The sensing circuit may perform sensing processing on all of signal segments of the pen signal or skips the sensing processing on some of the signal segments of the pen signal while performing the sensing processing on remaining signal segments of the pen signal, depending on whether or not the reference voltage is supplied to the second input port.

According to another aspect, aspects may also provide a pen touch sensing method including: driving all or some of the plurality of common electrodes during a pen touch sensing period simultaneous with display driving; sensing a pen signal by receiving the pen signal output from a pen through a target common electrode selected as a sensing target from among the plurality of common electrodes, performing sensing processing on the pen signal in a different manner, depending on whether or not a gate line through which a gate signal having a variable voltage level is applied, from among the plurality of gate lines, overlaps with the target common electrode, and generating sensing data according to a result of the sensing processing; and detecting one or more of a position, a tilt, and pen information of the pen in accordance with the sensing data.

According to exemplary aspects, even in the case in which a pen touch is detected simultaneously with the display driving, high pen touch sensitivity may be obtained.

In addition, according to aspects, the pen touch sensing able to remove or reduce panel interior noise may be provided.

In addition, according to aspects, even in the case in which a change in the voltage occurs in the internal components, such as the data lines and the gate lines, in the display driving, and such a voltage change acts as noise in the touch sensors, a pen touch may be accurately detected.

In addition, according to aspects, even in the case in which a touch is detected during the display driving, the operation of displaying images may be properly performed without an effect due to the touch sensing.

DESCRIPTION OF DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
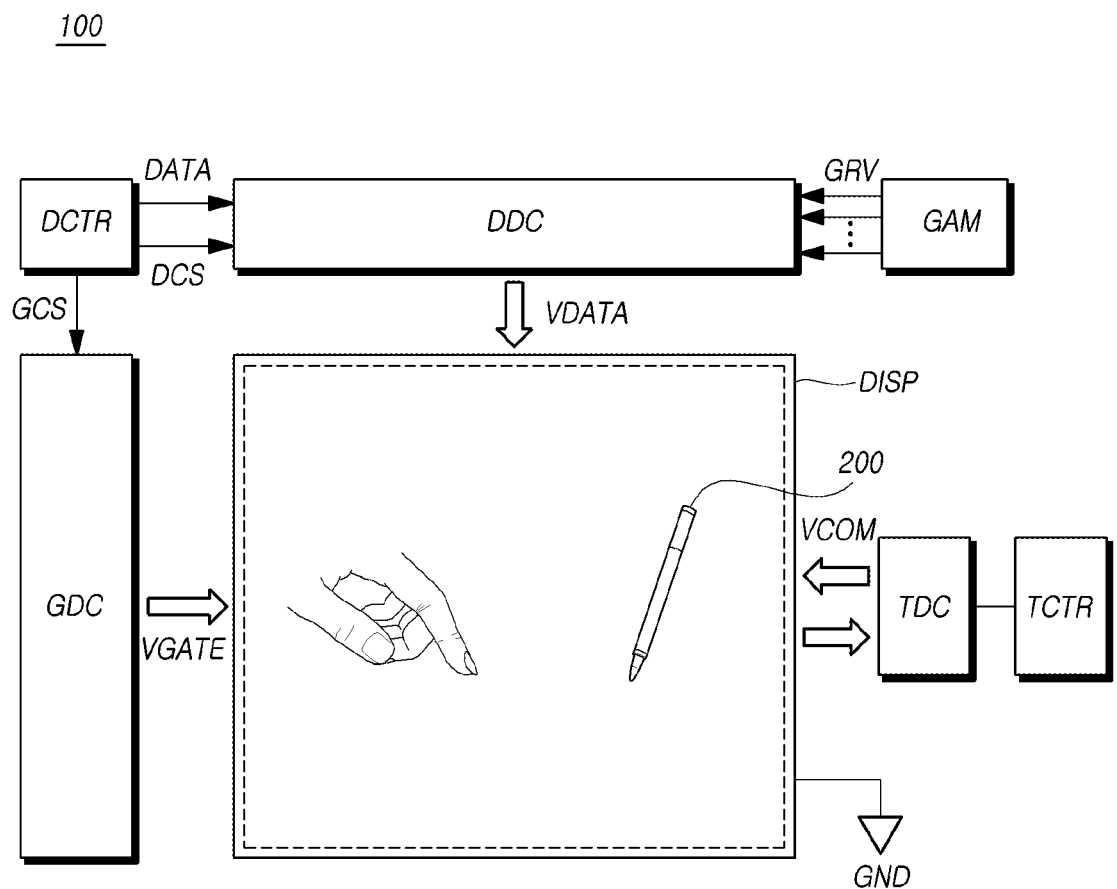
FIG. 1 is a diagram illustrating a system configuration of a touchscreen display device according to aspects.

In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps with" etc. a second element, it should be interpreted that, not only can the first element "be directly connected or coupled to" or "directly contact or overlap with" the second element, but a third element can also be "interposed" between the first and second elements, or the first and second elements can "be connected or coupled to", "contact or overlap with", etc. each other via a fourth element. Here, the second element may be included in at least one of two or more elements that "are connected or coupled to", "contact or overlap with", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, aspects will be described in detail with reference to the accompanying drawings.

Figure 2:
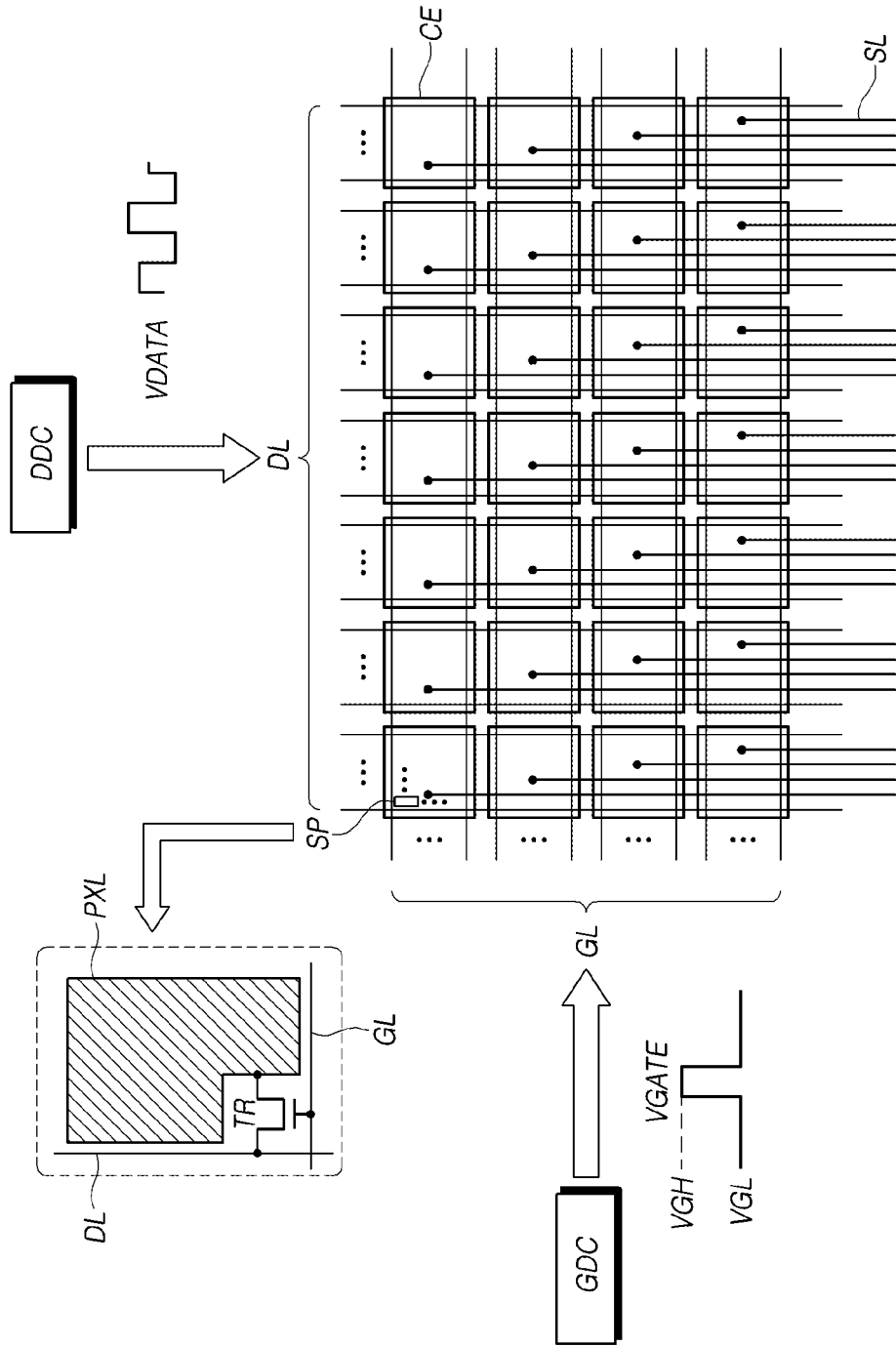
FIG. 2 is a diagram illustrating a display part of the touchscreen display device according to aspects.
Figure 3:
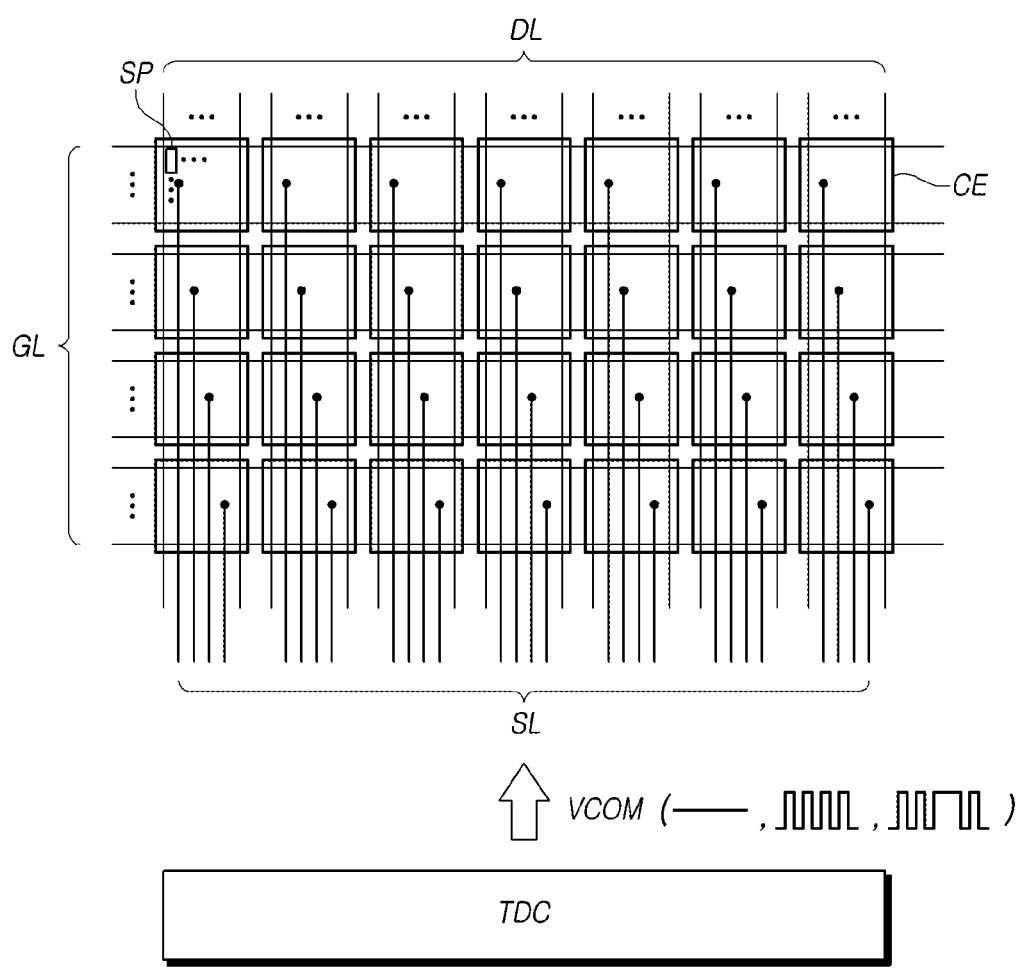
FIG. 3 is a diagram illustrating touch sensing part of the touchscreen display device according to aspects.

FIG. 1 is a diagram illustrating a system configuration of a touchscreen display device 100 according to aspects, FIG. 2 is a diagram illustrating a display part of the touchscreen display device 100 according to aspects, and FIG. 3 is a diagram illustrating a touch sensing part of the touchscreen display device 100 according to aspects.

Referring to FIG. 1, the touchscreen display device 100 according to aspects may provide a display function to display images. In addition, the touchscreen display device 100 according to aspects may provide a touch sensing function of detecting a touch input of a user using at least one of a finger and a pen 200 and a touch input function of performing input processing in response to the touch of the user using at least one of the finger and the pen 200 using a touch sensing result.

Referring to FIGS. 1 and 2, to provide the display function, the touchscreen display device 100 according to aspects may include a display panel DISP in which a plurality of data lines DL and a plurality of gate lines GL are disposed and a plurality of subpixels SP defined by the plurality of data lines DL and the plurality of gate lines GL are disposed and display driving circuits for driving the display panel DISP.

Referring to FIGS. 1 and 2, the display driving circuits may include a data driving circuit DDC driving the plurality of data lines DL, a gate driving circuit GDC driving the plurality of gate lines GL, a display controller DCTR controlling the data driving circuit DDC and the gate driving circuit GDC, and the like.

Referring to FIGS. 1 and 3, to provide the touch sensing function, the touchscreen display device 100 according to aspects may include: the display panel DISP in which a plurality of common electrodes CE are disposed; a touch driving circuit TDC driving and sensing the display panel DISP; and a touch controller TCTR detecting (or sensing) at least one of a touch and touch coordinates, or a combination thereof, input by the user using a pointer, by using touch sensing data according to a sensing result of the touch driving circuit TDC. The touch driving circuit TDC, the touch controller TCTR, and the like may be collectively referred to as a touch sensing circuit.

The touch sensing circuit may also include a power supply circuit necessary for touch driving and sensing, a variety of electronic components, a memory, and the like, in addition to the touch driving circuit TDC and the touch controller TCTR.

The pointer of the user may be at least one of the finger and the pen 200, or a combination thereof. The pen 200 may be a passive pen without a signal transmission and reception function or an active pen having a signal transmission and reception function. The passive pen may have the same touch characteristics as the finger. Therefore, a finger touch to be described hereinafter should be interpreted as including a touch using a passive pen.

Referring to FIG. 2, in the display panel DISP, the plurality of data lines DL arranged in rows (or columns), the plurality of gate lines GL arranged in columns (or rows), and the like may be disposed.

In addition, referring to FIG. 3, in the display panel DISP, a plurality of common electrodes CE and a plurality of signal lines SL electrically connecting the plurality of common electrodes CE and the touch driving circuit TDC may be disposed.

The touch driving circuit TDC may apply a touch driving signal TD to the entirety or some of the plurality of common electrodes CE and sequentially sense the entirety or some of the plurality of common electrodes CE.

The plurality of common electrodes CE may serve as both display driving electrodes necessary for display driving and touch electrodes necessary for touch driving (or touch sensing).

The plurality of common electrodes CE may be arrayed, for example, in the form of a matrix.

Each of the plurality of common electrodes CE may have a variety of shapes. For example, a single common electrode CE may be a plate-shaped electrode without an open area, a mesh-shaped electrode having open areas, or an electrode including a plurality of bends.

In a case in which the common electrode CE is a plate-shaped electrode, the common electrode CE may be a transparent electrode. In a case in which the common electrode CE is a mesh-shaped electrode or an electrode including bends, the common electrode CE may be an opaque electrode.

In addition, the display panel DISP may be a display panel having an in-cell touch sensor structure in which the plurality of common electrodes CE serving as touch sensors are integrally disposed.

Each of the plurality of common electrodes CE may overlap with one or more subpixels SP. Each of the plurality of common electrodes CE may overlap with one or more gate lines GL. Each of the plurality of common electrodes CE may overlap with a pixel electrode PXL in each of the subpixels SP.

In an active area, the plurality of signal lines SL may be disposed, for example, in parallel to the plurality of data lines DL. In some cases, in the active area, the plurality of signal lines SL may be disposed in parallel to the plurality of gate lines GL or may be disposed in a different direction or on a different track than either the plurality of data lines DL or the plurality of gate lines GL.

The touch driving circuit TDC is a circuit driving the plurality of common electrodes CE, and may supply a common voltage VCOM to the plurality of common electrodes CE through the plurality of signal lines SL in the display driving for displaying images and the touch driving for the touch sensing.

Since the plurality of common electrodes CE serve as both the display driving electrodes necessary for the display driving and the touch electrodes necessary for the touch driving (or touch sensing), the common voltage VCOM applied to the plurality of common electrodes CE may serve as both a display driving voltage and a touch driving signal.

The display controller DCTR controls the data driving circuit DDC and the gate driving circuit GDC by supplying a variety of control signals DCS and GCS to the data driving circuit DDC and the gate driving circuit GDC.

The display controller DCTR starts scanning at points in time realized by respective frames, converts image data input from an external source into digital image data having a data signal format readable by the data driving circuit DDC, outputs the digital image data DATA, and controls data driving at appropriate points in time according to the scanning.

The gate driving circuit GDC sequentially supplies a gate signal having an on or off voltage to the plurality of gate lines GL, under the control of the display controller DCTR.

When a specific gate line GL is opened by the gate driving circuit GDC, the data driving circuit DDC converts the image data signal, received from the display controller DCTR, into an analog image signal, and supplies a data signal VDATA, corresponding to the analog image signal, to the plurality of data lines DL.

The display controller DCTR may be a timing controller used in typical display technology, may be a control device including a timing controller and able to perform other control functions, or may be a control device different from the timing controller.

The display controller DCTR may be provided as a component separate from the data driving circuit DDC, or may be combined with the data driving circuit DDC to form an integrated circuit (IC).

The data driving circuit DDC drives the plurality of data lines DL by supplying the data signal VDATA to the plurality of data lines DL. Herein, the data driving circuit DDC may also be referred to as a "source driver".

The data driving circuit DDC may include one or more source driver ICs (SDICs). Each of the source driver ICs may include a shift register, a latch circuit, a digital-to-analog converter (DAC), an output buffer circuit, etc. In some cases, each of the source driver ICs may further include an analog-to-digital converter (ADC).

Each of the source driver ICs may be connected to a bonding pad of the display panel DISP by a tape-automated bonding (TAB) method or a chip-on-glass (COG) method, may be directly mounted on the display panel DISP, or in some cases, may be provided as an integrated portion of the display panel DISP. In addition, each of the source driver ICs may be implemented using a chip-on-film (COF) structure mounted on a film connected to the display panel DISP.

The gate driving circuit GDC sequentially drives the plurality of gate lines GL by sequentially supplying a gate signal VGATE (also referred to as a scan voltage, a scan signal, or a gate voltage) to the plurality of gate lines GL. Herein, the gate driving circuit GDC may also be referred to as a "scan driver".

The gate signal VGATE may be generated using an off-level gate voltage by which the corresponding gate line GL is closed and an on-level gate voltage by which the corresponding gate line GL is opened.

More specifically, the gate signal VGATE may be generated using a turn-off-level gate voltage, by which a transistor connected to the corresponding gate line GL is turned off, and a turn-on-level gate voltage, by which a transistor connected to the corresponding gate line GL is turned on.

In a case in which the transistor is an N-type transistor, the turn-off-level gate voltage may be a low-level gate voltage VGL, and the turn-on-level gate voltage may be a high-level gate voltage VGH. In a case in which the transistor is a P-type transistor, the turn-off-level gate voltage may be a high-level gate voltage VGH, and the turn-on-level gate voltage may be a low-level gate voltage VGL. Hereinafter, for the sake of brevity, the turn-off-level gate voltage will be described as being the low-level gate voltage VGL and the on-level gate voltage will be described as being the high-level gate voltage VGH by way of example.

The gate driving circuit GDC may include one or more gate driver ICs (GDICs). Each of the gate driver ICs may include a shift register, a level shifter, and the like.

Each of the gate driver ICs may be connected to a bonding pad of the display panel DISP by a TAB method or a COG method, may be implemented using a gate-in-panel (GIP) structure directly mounted on the display panel DISP, or in some cases, may be provided as an integrated portion of the display panel DISP. In addition, each of the gate driver ICs may be implemented using a COF structure mounted on a film connected to the display panel DISP.

The data driving circuit DDC may be disposed on one side of the display panel DISP (e.g. on or adjacent to the upper or lower portion of the display panel DISP), as illustrated in FIG. 1. In some cases, the data driving circuit DDC may be disposed on both sides of the display panel DISP (e.g. on or adjacent to the upper and lower portions of the display panel DISP), depending on the driving method, the design of the display panel, or the like.

The gate driving circuit GDC may be disposed on one side of the display panel DISP (e.g. on or adjacent to the right or left portion of the display panel DISP), as illustrated in FIG. 1. In some cases, the gate driving circuit GDC may be disposed on both sides of the display panel DISP (e.g. on or adjacent to the right and left portions of the display panel DISP), depending on the driving method, the design of the display panel, or the like.

The touchscreen display device 100 according to aspects may be a variety of display devices, such as a liquid crystal display (LCD) device and an organic light-emitting diode (OLED) display device. The display panel DISP according to aspects may be a variety of display panels, such as an LCD panel and an OLED display panel.

Each of the subpixels SP disposed on the display panel DISP may include one or more circuit elements (e.g. a transistor (TR) and a capacitor).

For example, in a case in which the display panel DISP is an LCD panel, a pixel electrode PXL may be disposed in each of the subpixels SP, and a transistor TR may be electrically connected to the pixel electrode PXL and a corresponding data line DL. The transistor TR may be turned on by the gate signal VGATE supplied to a gate node through a corresponding gate line GL. When turned on, the transistor TR may output the data signal VDATA, supplied to a source node (or drain node) through the data line DL, through a drain node (or source node) to apply the data signal VDATA to the pixel electrode PXL electrically connected to the drain node (or source node). An electric field may be generated between the pixel electrode PXL, to which the data signal VDATA is applied, and a corresponding common electrode CE, to which the common voltage VCOM is applied, and storage capacitance may be generated between the pixel electrode PXL and the common electrode CE.

The structure of each of the subpixels SP may be determined variously, depending on the type of the panel, functions to be provided, the design, and the like.

As described above, the plurality of common electrodes CE correspond to touch sensors (or touch electrodes), to which the common voltage VCOM serving as a touch driving signal in the touch driving is applied by the touch driving circuit TDC, and which may be sensed by the touch driving circuit TDC.

In addition, the plurality of common electrodes CE may be driving electrodes to which the common voltage VCOM, a type of display driving voltage, is applied. In the display driving, the common voltage VCOM may generate an electric field together with the data signal VDATA.

Due to such dual functions of the plurality of common electrodes CE, the common voltage VCOM applied to the plurality of common electrodes CE may serve as both the display driving voltage and the touch driving signal.

In a case in which the display driving and the touch driving are performed at different points in time, the common electrodes CE serve as the display driving electrodes during a display driving period and serve as the touch sensors during a touch driving period different from the display driving period.

In a case in which both the display driving and the touch driving are performed as will be described below, the common electrodes CE serve as both the display driving electrodes and the touch sensors during a simultaneous driving period in which both the display driving and the touch driving are performed simultaneously.

Referring to FIGS. 2 and 3, in a first common electrode and a second common electrode disposed in the same column, among the plurality of common electrodes CE, two or more data lines DL overlapping with the first common electrode may also overlap with the second common electrode in the same manner. However, two or more gate lines GL overlapping with the first common electrode do not overlap with the second common electrode.

The plurality of signal lines SL include a first signal line electrically connecting the first common electrode and the touch driving circuit TDC and a second signal line electrically connecting the second common electrode and the touch driving circuit TDC.

The first signal line and the second signal line are insulated in the display panel DISP. In some cases, the first signal line and the second signal line may be electrically connected in the touch driving circuit TDC.

The first signal line may overlap with the second common electrode while being insulated from the second common electrode of the display panel DISP.

In addition, the touch controller TCTR may be implemented as, for example, a micro-control unit (MCU), a processor, or the like.

The display controller DCTR and the touch controller TCTR may be provided separately or may be integrated together.

The touchscreen display device 100 according to aspects may detect a touch on the basis of self-capacitance of the common electrodes CE or mutual capacitance between the common electrodes CE.

In a case in which the touchscreen display device 100 according to aspects detects a touch on the basis of self-capacitance, the touch driving circuit TDC may output sensing data by supplying the common voltage VCOM serving as the touch driving signal to the entirety or some of the plurality of common electrodes CE and sensing touch sensing signals from the common electrodes CE, to which the common voltage VCOM serving as the touch driving signal is applied, and the touch controller TCTR may perform at least one of detecting a touch and determining touch coordinates, or a combination thereof, using the sensing data.

In a case in which the touchscreen display device 100 according to aspects detects a touch on the basis of mutual capacitance, the touch driving circuit TDC may output the sensing data by supplying the common voltage VCOM serving as the touch driving signal to common electrodes serving as driving electrodes, among the plurality of common electrodes CE, and sensing touch sensing signals from other common electrodes serving as sensing electrodes, among the plurality of common electrodes CE, and the touch controller TCTR may perform at least one of detecting a touch and determining touch coordinates, or a combination thereof, using the sensing data.

Hereinafter, for the sake of brevity, the touchscreen display device 100 according to aspects will be taken as detecting a touch on the basis of the self-capacitance.

The common voltage VCOM output from the touch driving circuit TDC may be a complicated signal having a variety of forms, depending on the function of the common electrodes CE, the type of the driving period, or the like.

That is, the common voltage VCOM may be a signal having a constant voltage level or a variable voltage level, depending on the function and the type of the driving period of the common electrodes CE.

In a case in which the common voltage VCOM is a signal having a variable voltage level, the common voltage VCOM may be a variety of signal waveforms, for example, a sine wave, a triangular wave, or a square wave.

In addition, the data driving circuit DDC may convert the digital image data DATA, received from the display controller DCTR, into the data signal VDATA in the form of an analog voltage using a digital-to-analog converter (DAC).

In digital-analog conversion, the data driving circuit DDC may convert the digital image data DATA into the data signal VDATA in the form of an analog voltage, on the basis of a plurality of gamma reference voltages (GRV).

The plurality of gamma reference voltages are supplied by a gamma circuit (GAM). The gamma circuit may be located outside or inside of the data driving circuit DDC.

In addition, a ground voltage GND may be applied to the display panel DISP. The ground voltage GND may be a voltage (e.g. a direct current (DC) voltage) having a constant voltage level or a voltage (e.g. an alternating current (AC) voltage) having a variable voltage level.

For example, in a case in which the ground voltage GND is a voltage having a variable voltage level, at least one of the frequency, the phase, the amplitude, or combinations thereof, of the ground voltage GND may correspond to that of the common voltage VCOM having a variable voltage level.

Figure 4:
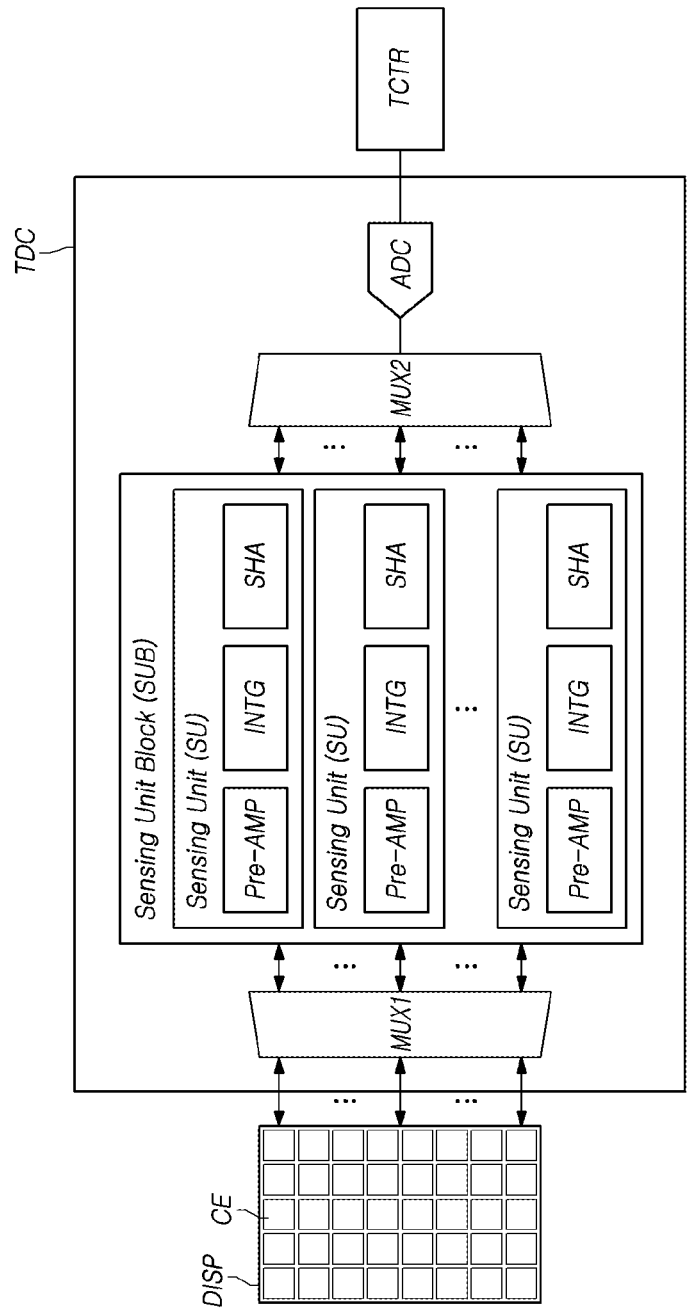
FIG. 4 is a diagram illustrating the touch driving circuit of the touchscreen display device according to aspects.

FIG. 4 is a diagram illustrating the touch driving circuit TDC of the touchscreen display device 100 according to aspects.

Referring to FIG. 4, the touch driving circuit TDC according to aspects may include a first multiplexer circuit MUX1, a sensing unit block SUB including a plurality of sensing units SU, a second multiplexer circuit MUX2, an analog-to-digital converter ADC, and the like.

The first multiplexer circuit MUX1 may include one or more multiplexers. The second multiplexer circuit MUX2 may include one or more multiplexers.

Referring to FIG. 4, each of the sensing units SU in the sensing unit block SUB may include a preamplifier Pre-AMP, an integrator INTG, a sample and hold circuit SHA, and the like.

For example, the preamplifier Pre-AMP may include an operation amplifier OP-AMP including two or more input ports and a single output port, a feedback capacitor connected to one input port of the two or more input ports and the single output port, and the like.

One input port of the two or more input ports of the preamplifier Pre-AMP is electrically connected to a corresponding common electrode CE selected as a sensing target by the first multiplexer circuit MUX1, while the other input port may have the common voltage VCOM input thereto. The common voltage VCOM may serve as a reference voltage comparable to a voltage sensed in the touch sensing.

The preamplifier Pre-AMP may detect a signal from the common electrode CE selected as a sensing target and connected to the preamplifier Pre-AMP, and output the detected signal.

More specifically, when the feedback capacitor is charged with electric charge corresponding to the signal input from the common electrode CE selected as a sensing target, the preamplifier Pre-AMP outputs an output signal corresponding to the charged electric charge.

The output signal of the preamplifier Pre-AMP may be input to the integrator INTG. The integrator INTG may output an integrated value by integrating the input signal. The integrated value output from the integrator INTG may be input to the sample and hold circuit. The sample and hold circuit stores the input signal (i.e. the integrated value) therein.

The second multiplexer circuit MUX2 selects one sensing unit SU from among the plurality of sensing units SU and outputs the signal stored in the sample and hold circuit of the selected sensing unit SU. The analog-to-digital converter ADC generates a sensing value by converting the signal, input through the second multiplexer circuit MUX2, into a digital value. The touch driving circuit TDC outputs sensing data including the sensing value generated by the analog-to-digital converter ADC.

The touch controller TCTR may detect at least one of a finger touch and a touch position, or a combination thereof, or may detect information regarding a pen touch, such as a touch, a touch position, a tilt, and additional information regarding the pen 200, on the basis of the sensing data.

The above-described preamplifier Pre-AMP may be a charge amplifier, or in some cases, may be implemented as a differential amplifier differentially sensing two common electrodes CE.

Figure 5:
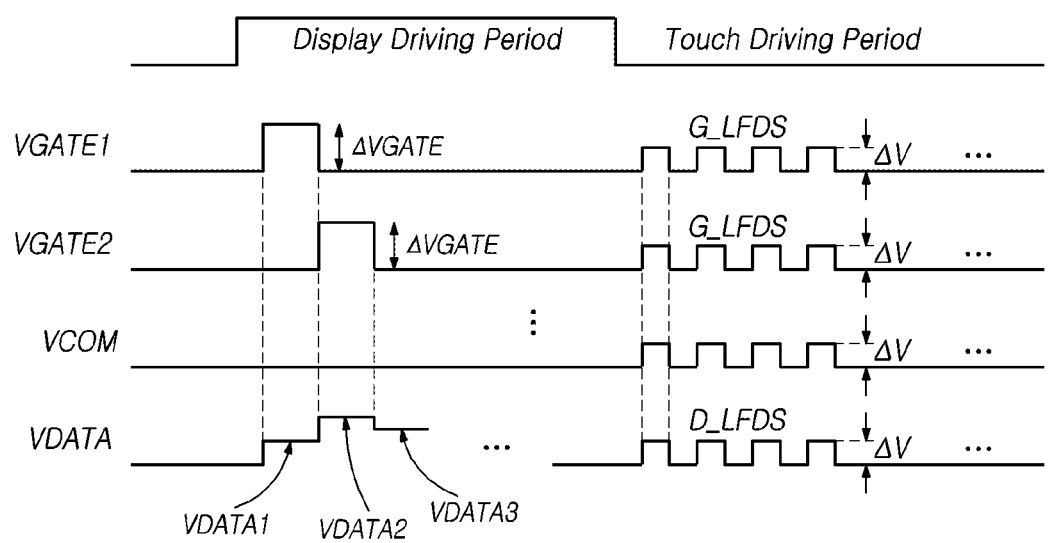
FIG. 5 is a timing diagram illustrating time division driving of the touchscreen display device according to aspects.

FIG. 5 is a timing diagram illustrating time division driving of the touchscreen display device 100 according to aspects.

Referring to FIG. 5, the touchscreen display device 100 according to aspects may perform the display driving and the touch driving separately in time-divided segments, i.e. time slots. This type of driving will be referred to as time division driving.

The display driving means a type of driving to display images over display frame times.

During the display driving period in which the display driving is performed, while the plurality of gate lines GL are being scanned, the data signals VDATA may be applied to the plurality of data lines DL.

In the touch driving period different from the display driving period, the display driving is not performed. During the touch driving period, the touch driving described with reference to FIG. 4 is performed, so that at least one of the finger touch sensing and the pen touch sensing, or a combination thereof is performed.

During the display driving period, while the plurality of gate lines GL are being scanned, the data signals VDATA may be applied to the plurality of data lines DL. The display driving is not performed during the touch driving period.

Referring to FIG. 5, in the time division driving, during the display driving period, the common voltage VCOM in the form of a DC voltage having a constant voltage level is applied to the plurality of common electrodes CE.

In the time division driving, during the display driving period, the plurality of gate lines GL are sequentially scanned. That is, gate signals VGATE1, VGATE2, and . . . having turn-on levels may be sequentially supplied to the plurality of gate lines GL.

The gate signals VGATE1, VGATE2, and . . . have a turn-on-level gate voltage VGH in a predetermined period (e.g. a gate driving period) and a turn-off-level gate voltage VGL in the remaining period. Accordingly, during a single frame period, the gate signals VGATE1, VGATE2, and . . . , sequentially supplied to the plurality of gate lines GL, have a voltage level change (ΔVGATE). That is, during the single frame period, the voltages of the plurality of gate lines GL may change.

In the time division driving, during the display driving period, when the plurality of gate lines GL are sequentially scanned, the data signals VDATA may be supplied to sub-pixels SP connected to the scanned gate lines GL through the plurality of data lines DL.

The data signal VDATA supplied to a single data line DL has a data voltage VDATA1 supplied to a subpixel SP connected to a first gate line when the first gate line is being scanned, a data voltage VDATA2 supplied to a subpixel SP connected to a second gate line when the second gate line is being scanned, a data voltage VDATA3 supplied to a sub-pixel SP connected to a third gate line when the third gate line is being scanned, and the like. That is, the voltage level of the data signal VDATA supplied to a single data line DL changes with the passage of the driving time, e.g. VDATA1→4 VDATA2→VDATA3→ . . . .

After the above-described display driving period, during the touch driving period, the common voltage VCOM is supplied to the entirety or some of the plurality of common electrodes CE.

The touch driving period may be a finger touch driving period in which a finger touch is detected or a pen touch driving period in which a pen touch is detected. Alternatively, the touch driving period may include at least one finger touch driving period in which the finger touch is detected and at least one pen touch driving period in which the pen touch is detected.

During the finger touch driving period, the common voltage VCOM supplied to the entirety or some of the plurality of common electrodes CE may be a signal having a predetermined amplitude ΔV, with the voltage level thereof being variable. Such a signal may be referred to as an AC signal, a modulation signal, or the like.

During the pen touch driving period, the common voltage VCOM supplied to the entirety or some of the plurality of common electrodes CE may be a signal having a variable voltage level or may be a signal having a constant voltage level.

In addition, referring to FIG. 5, during the touch driving period (e.g. the finger touch driving period), when the common voltage VCOM having a variable voltage level is applied to one or more common electrodes CE, a load free driving signal (LFDS) may be supplied to one or more data lines DL, one or more gate lines GL, or the like.

During the touch driving period, when the common voltage VCOM having a variable voltage level is applied to one or more common electrodes CE, a gate-related load free driving signal G_LFDS may be supplied to one or more gate lines GL.

During the touch driving period, when the common voltage VCOM having a variable voltage level is applied to one or more common electrodes CE, a data-related load free driving signal D_LFDS may be supplied to one or more data lines DL.

In addition, during the touch driving period, when the common voltage VCOM having a variable voltage level is applied to one or more common electrodes CE, the load free driving signal may be supplied to one or more other common electrodes CE. For example, during the touch driving period, the common voltage VCOM having a variable voltage level may be applied to the entirety of the common electrodes CE, common electrodes CE may be sequentially selected as sensing targets from among the entirety of the common electrodes CE, and one or more selected common electrodes CE may be sensed.

During the touch driving period (e.g. the finger touch driving period), when the common voltage VCOM having a predetermined amplitude ΔV, with the voltage level thereof being variable, is applied to one or more common electrodes CE, at least one of the frequency, the phase, the amplitude, or combinations thereof, of the load free driving signal applied to one or more data lines DL, one or more gate lines GL, or other common electrodes CE may correspond to that of the common voltage VCOM. For example, the frequency, phase, and amplitude of the load free driving signal may be the same as those of the common voltage VCOM.

The supply of the load free driving signal as described above may prevent a common electrode CE selected as a sensing target from generating unnecessary parasitic capacitance together with another electrode or another line in the touch driving (e.g. the finger touch driving), thereby improving touch sensitivity.

Figure 6:
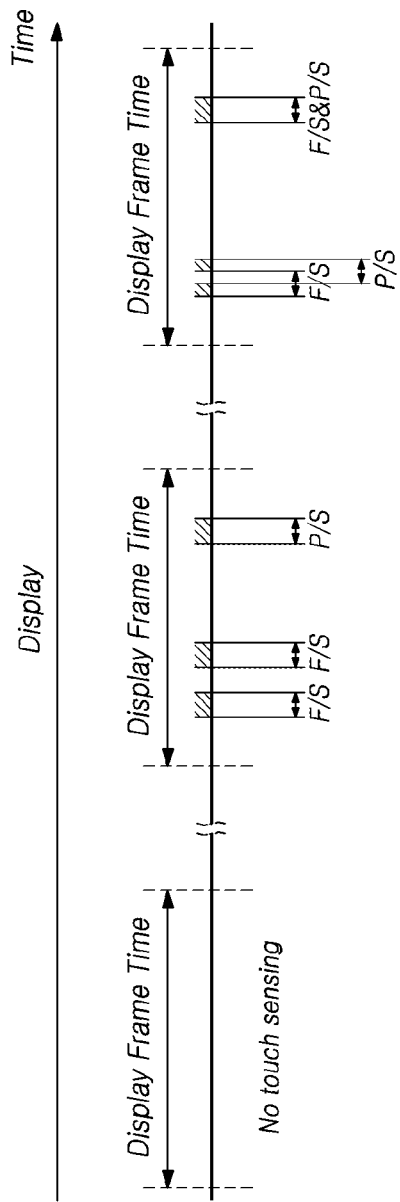
FIG. 6 is a diagram illustrating independent processing of the display driving and the touch driving in the touchscreen display device according to aspects.

FIG. 6 is a diagram illustrating independent processing of the display driving and the touch driving in the touchscreen display device 100 according to aspects.

Referring to FIG. 6, the touchscreen display device 100 according to aspects may perform a touch sensing operation (e.g. finger touch sensing and pen touch sensing) independently of a display operation.

During a specific display frame time (e.g. an i$^{th}$ display frame time), only the display driving for displaying images may be performed without performing finger touch sensing F/S or pen touch sensing P/S.

During another specific display frame time (e.g. a j$^{th}$ display frame time and a kth display frame time), the touch driving for the finger touch sensing F/S and the pen touch sensing P/S may be performed in the display driving.

In this case, both the display driving for displaying images and the finger touch driving for sensing a finger touch may be simultaneously performed. In addition, both the display driving for displaying images and the pen touch driving for sensing a pen touch may be simultaneously performed. In this sense, independent processing of the display driving and the touch driving will also be referred to as simultaneous driving.

In addition, the finger touch sensing F/S may be performed only in a required time segment (or a required time slot) within a single display frame time.

In addition, the pen touch sensing P/S may be performed only in a required time segment within a single display frame time.

The finger touch sensing F/S and the pen touch sensing P/S may be performed in different time segments so as not to overlap with each other.

In some cases, the finger touch sensing F/S and the pen touch sensing P/S may partially overlap with each other in time or may be performed in the completely same time segment. In this case, the result of the finger touch sensing F/S and a sensing result of the pen touch sensing P/S may be distinguished by a predetermined algorithm or sensing position-based signal analysis, performed by the touch controller TCTR or the like.

In addition to the above examples, the display driving and the touch sensing (e.g. finger touch sensing F/S and pen touch sensing P/S) may be performed independently at a variety of points in time.

Figure 7:
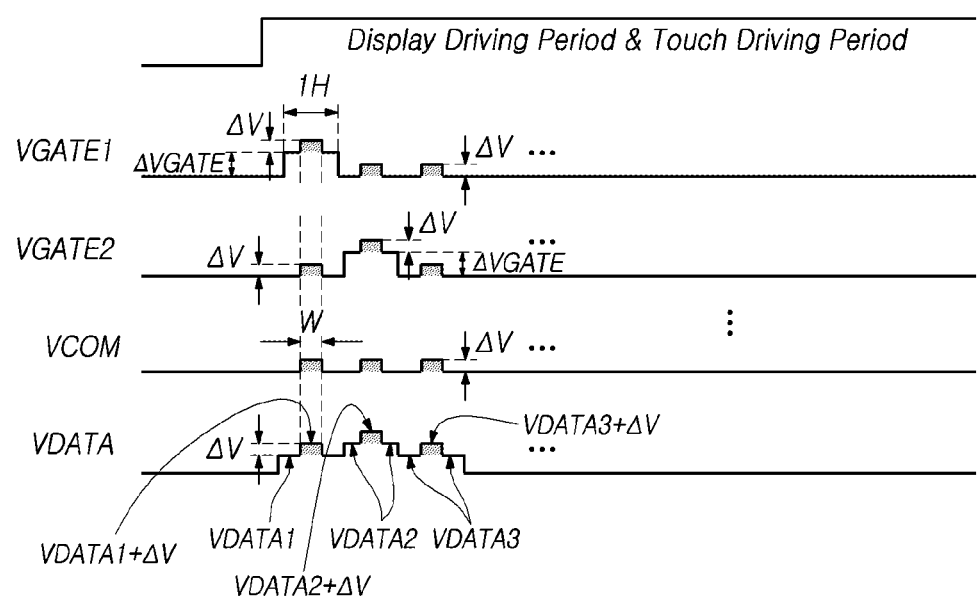
FIGS. 7 and 8 are timing diagrams illustrating simultaneous processing of display driving and touch driving in the touchscreen display device according to aspects.
Figure 8:
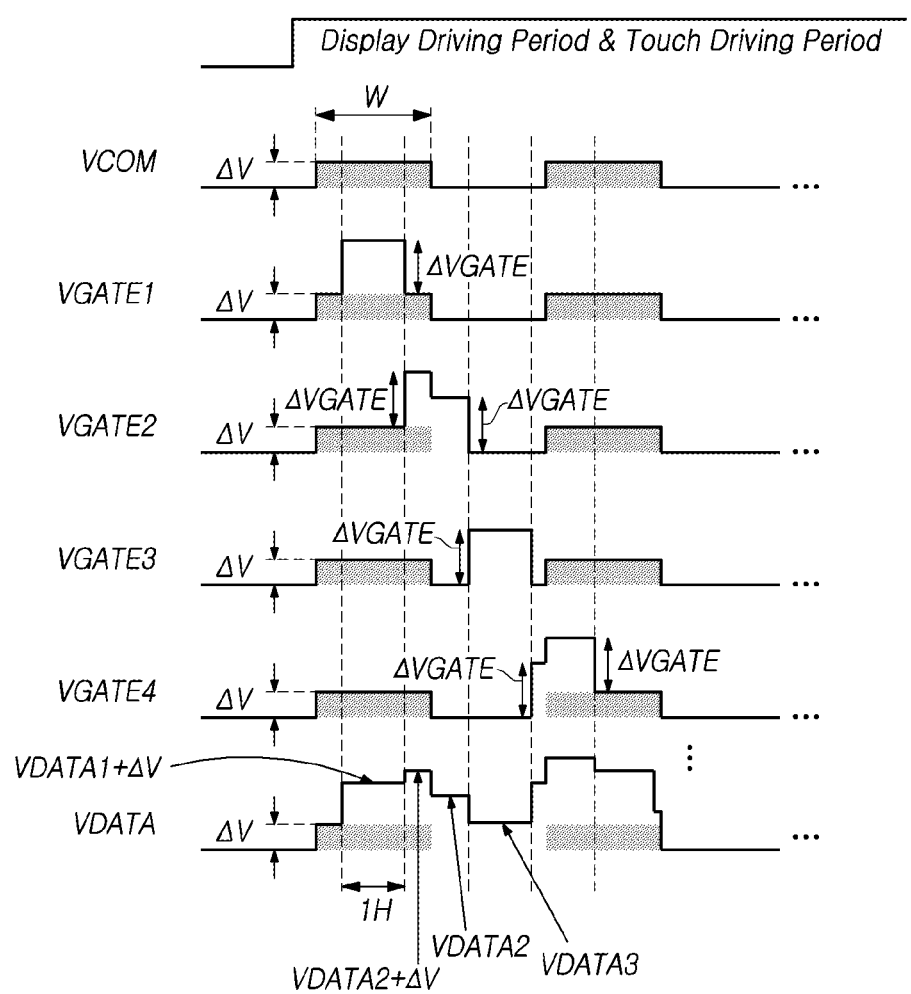

FIGS. 7 and 8 are timing diagrams illustrating simultaneous driving of display driving and touch driving in the touchscreen display device 100 according to aspects.

Referring to FIGS. 7 and 8, the touchscreen display device 100 according to aspects may simultaneously perform the display driving and the touch driving. This type of driving will be referred to as simultaneous driving. Here, FIGS. 7 and 8 are driving timing diagrams illustrating the finger touch driving.

Referring to FIGS. 7 and 8, while the display driving is being performed, with the data signal VDATA for displaying image being supplied to the plurality of data lines DL, the touch driving circuit TDC may supply the common voltage VCOM swinging at a predetermined amplitude ΔV to the entirety or some of the plurality of common electrodes CE.

In the simultaneous driving, the plurality of common electrodes CE serve as both the display driving electrodes and the touch electrodes. Thus, the common voltage VCOM serves as both the display driving voltage and the touch driving signal.

In a case in which both the finger touch driving and the display driving are performed, the common voltage VCOM may be a signal, the voltage level of which swings (changes). The common voltage VCOM will also be referred to as a modulation signal, an AC signal, a pulse signal, or the like.

In a case in which the finger touch driving and the display driving are simultaneously performed, each of the data signals VDATA is in the form of a signal obtained by adding the common voltage VCOM to an original data signal for displaying an image. That is, the data signals VDATA have complicated signal waveforms in which the amplitude ΔV of the common voltage VCOM is added to original data voltage values VDATA1, VDATA2, VDATA3, and . . . .

In a case in which the finger touch driving and the display driving are simultaneously performed, each of the gate signals VGATE1, VGATE2, and . . . is in the form of a signal obtained by adding the common voltage VCOM to an original gate signal supplied to a corresponding gate line GL. That is, each of the gate signals VGATE1, VGATE2, and . . . has a complicated signal waveform in which the amplitude ΔV of the common voltage VCOM is added to a scanning voltage value, e.g. VGH or VGL.

Referring to FIG. 7, the width W of a high-level voltage period of the common voltage VCOM may be shorter than a single horizontal period 1H for the display driving.

In this case, reviewing changes in the signal waveform of the data signal VDATA, during the single horizontal period 1H, the data signal VDATA supplied to a single subpixel SP through the single data line DL may have two or more segments (or slots) having different voltage values.

For example, when a first gate line is scanned, the data signal VDATA supplied to a subpixel connected to the first gate line may have at least one segment having an original first data voltage value VDATA1 and at least one segment having a voltage value VDATA1+ΔV obtained by adding the original first data voltage value VDATA1 and the amplitude ΔV of the common voltage VCOM. When a second gate line is scanned, the data signal VDATA supplied to a subpixel connected to the second gate line may have at least one segment having an original second data voltage value VDATA2 and at least one segment having a voltage value VDATA2+ΔV obtained by adding the original second data voltage value VDATA2 and the amplitude ΔV of the common voltage VCOM. When a third gate line is scanned, the data signal VDATA supplied to a subpixel connected to the third gate line may have at least one segment having an original third data voltage value VDATA3 and at least one segment having a voltage value VDATA3+ΔV obtained by adding the original third data voltage value VDATA3 and the amplitude ΔV of the common voltage VCOM.

Referring to FIG. 7, the width W of the high-level voltage period of the common voltage VCOM may be shorter than the single horizontal period 1H for the display driving. In this case, reviewing changes in the signal waveform of each of the gate signals VGATE1, VGATE2, and . . . , the gate signal (i.e. one of VGATE1, VGAGE2, and . . . ) supplied through a single gate line GL may have two or more segments having different voltage values during the single horizontal period 1H.

Referring to FIG. 8, the width W of the high-level voltage period of the common voltage VCOM may be longer than the single horizontal period 1H for the display driving.

In this case, during the high-level voltage period of the common voltage VCOM, two or more gate lines GL may be scanned.

For example, a first high-level voltage period of the common voltage VCOM may overlap with a period in which the first gate line is scanned and a period in which the second gate line is scanned. Thus, during the first high-level voltage period of the common voltage VCOM, the gate signal VGATE1 applied to the first gate line may include at least one first segment having a voltage value obtained by adding the turn-off-level gate voltage VGL and the amplitude ΔV of the common voltage VCOM and at least one second segment having a voltage value obtained by adding the turn-on-level gate voltage VGH and the amplitude ΔV of the common voltage VCOM. A voltage difference between the first segment and the second segment is ΔVGATE.

During the high-level voltage period of the common voltage VCOM, the voltage levels of the gate signals VGATE1, VGATE2, VGATE3 and VGATE4, supplied to one or more gate lines GL, the scanning periods of which overlap with the high-level voltage period of the common voltage VCOM, among the plurality of gate lines GL, change two or more times.

In a case in which the width W of the high-level voltage period of the common voltage VCOM is longer than the single horizontal time 1H for the display driving, during the high-level voltage period of the common voltage VCOM, the data signal VDATA for displaying images, supplied to the single data line DL, may have two or more segments having different voltage values.

During the first high-level voltage period of the common voltage VCOM, the data signal VDATA supplied to a corresponding data line DL may include a segment having a voltage value VDATA1+ΔV obtained by adding the first data voltage value VDATA1 and the amplitude ΔV of the common voltage VCOM, a segment having a voltage value VDATA2+ΔV obtained by adding the second data voltage value VDATA2 and the amplitude ΔV of the common voltage VCOM, and the like.

The voltage value VDATA1+ΔV obtained by adding the first data voltage value VDATA1 and the amplitude ΔV of the common voltage VCOM is supplied to a corresponding subpixel SP when a first gate line is being scanned. The voltage value VDATA2+ΔV obtained by adding the second data voltage value VDATA2 and the amplitude ΔV of the common voltage VCOM is supplied to a corresponding subpixel SP when a second gate line is being scanned after the first gate line.

Referring to FIGS. 7 and 8, in the simultaneous driving, the data signal VDATA applied to the data line DL has a form in which an original data voltage portion for displaying an image and the common voltage VCOM having periodically-repeating high and low levels with a predetermined amplitude ΔV are added. Accordingly, the voltage level of the data signal VDATA may be changed with changes in the voltage level of the common voltage VCOM as well as with changes in the original data voltage portion.

In the same manner, in the simultaneous driving, each of the gate signals VGATE1, VGATE2, VGATE3, and VGATE4 applied to the gate line GL has a form obtained by adding the common voltage VCOM to a signal portion indicative of the original gate voltage, e.g. VGH or VGL, for the gate driving. Accordingly, the voltage levels of the gate signal VGATE1, VGATE2, VGATE3, and VGATE4 may be changed in response to changes in the common voltage VCOM as well as with changes in the voltage between the turn-on-level gate voltage VGH and the turn-off-level gate voltage VGL.

As described above, it may be possible to change (or modulate) the signal waveform of each of the data signal VDATA and the gate signal VGATE by reflecting a change in the voltage level of the common voltage VCOM, so that the display driving may be less influenced by the touch driving in the simultaneous driving, even in the case in which the display driving and the touch driving are simultaneously performed.

In addition, it may be possible to change (or modulate) the signal waveform of each of the data signal VDATA and the gate signal VGATE by reflecting the change in the voltage level of the common voltage VCOM, thereby preventing the common electrodes CE from generating unnecessary parasitic capacitance together with other electrodes or conductive lines.

For example, the modulation of the signal waveform for the simultaneous driving may be performed by gamma modulation or ground modulation.

In case of the gamma modulation, the data signal VDATA may be changed by digital-analog conversion performed using a gamma reference voltage GRW, the frequency, phase, and amplitude ΔV of which correspond to those of the common voltage VCOM, when the data driving circuit DDC performs the digital-analog conversion.

In addition, the gamma modulation may change the signal waveform of the gate signal VGATE by changing each of the turn-off-level voltage VGL and the turn-on-level voltage VGH necessary for generation of the gate signal VGATE so that the frequency, phase, and amplitude ΔV thereof correspond to those of the common voltage VCOM.

The ground modulation is a method of modulating the ground voltage GND applied to the display panel DISP into a signal having a variable voltage level so that all types of signals applied to the display panel DISP swing on the basis of the ground voltage GND. Here, at least one of the frequency, amplitude, phase, or combinations thereof, of the modulated ground voltage GND may correspond to that of the common voltage VCOM.

Figure 9:
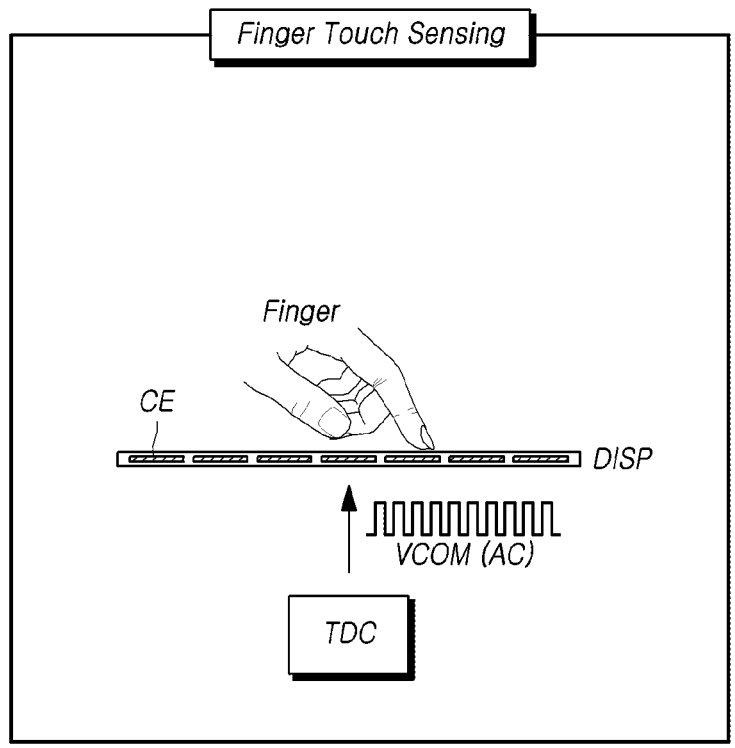
FIG. 9 is a diagram illustrating panel driving of the touchscreen display device according to aspects for the finger touch sensing.

FIG. 9 is a diagram illustrating panel driving of the touchscreen display device 100 according to aspects for the finger touch sensing.

Referring to FIG. 9, the touchscreen display device 100 according to aspects drives the display panel DISP using the common voltage VCOM in the form of an AC voltage having a variable voltage level in order to enable the finger touch sensing.

That is, the touch driving circuit TDC of the touchscreen display device 100 supplies the common voltage VCOM in the form of an AC voltage having a variable voltage level to one or more common electrodes CE in the display panel DISP in order to enable the finger touch sensing.

Figure 10:
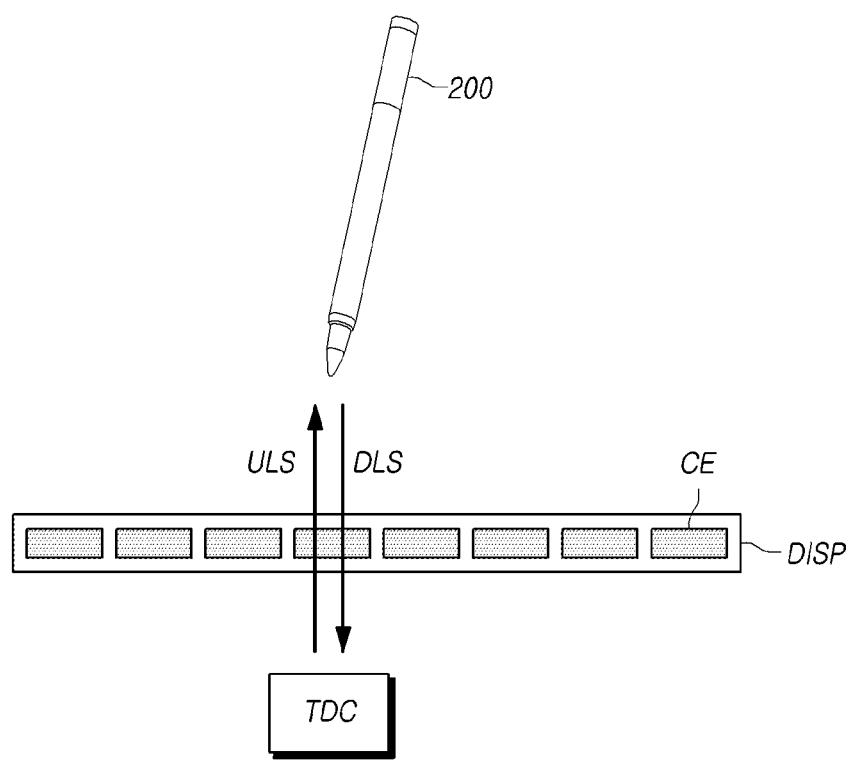
FIG. 10 is a diagram illustrating bidirectional communication for pen touch sensing in the touchscreen display device according to aspects.

FIG. 10 is a diagram illustrating bidirectional communication for pen touch sensing in the touchscreen display device 100 according to aspects.

Referring to FIG. 10, the touch driving circuit TDC of the touchscreen display device 100 according to aspects may communicate with the pen 200 via the display panel DISP in a bidirectional manner to enable the pen touch sensing.

A signal transmission path from the display panel DISP to the pen 200 will be referred to as an uplink, while a signal transmission path from the pen 200 to the display panel DISP will be referred to as a downlink.

A signal supplied to the display panel DISP by the touch driving circuit TDC and transferred to the pen 200 through the display panel DISP will be referred to as an uplink signal ULS. That is, a signal transferred to the pen 200 from the display panel DISP through the uplink is referred to as an uplink signal ULS.

A signal supplied to the display panel DISP by the pen 200 and transferred to the touch driving circuit TDC through the display panel DISP will be referred to as a downlink signal DLS. That is, a signal transferred to touch driving circuit TDC from the pen 200 through the downlink is referred to as a downlink signal DLS.

A method and timing for transmission and reception of signals, as well as the format of signals transmitted and received, between the touchscreen display device 100 and the pen 200 by the pen touch driving and for the pen touch sensing through the pen touch driving are previously defined as protocols. Such a protocol may be a program, or codes or data related to the program, so as to be stored in the touch driving circuit TDC and the pen 200 or executed by the touch driving circuit TDC and the pen 200.

For the pen touch driving for sensing a pen touch, the touchscreen display device 100 may define a cooperative operation between the touchscreen display device 100 and the pen 200, control a driving operation of the pen 200, or provide the uplink signal including various pieces of information necessary for the driving operation of the pen 200 to the pen 200.

More specifically, the touch driving circuit TDC of the touchscreen display device 100 supplies the uplink signal ULS to one or more common electrodes CE among the plurality of common electrodes CE of the display panel DISP. Accordingly, the pen 200 adjacent to the display panel DISP may receive the uplink signal ULS through one or more common electrodes CE among the plurality of common electrodes CE of the display panel DISP.

In response to the uplink signal ULS transmitted by the touchscreen display device 100, the pen 200 may output the downlink signal DLS allowing the touch driving circuit TDC to sense at least one of pen coordinates (or a position) regarding the pen 200 and a pen tilt (also simply referable to as a tilt), or a combination thereof.

Alternatively, in response to the uplink signal ULS transmitted by the touchscreen display device 100, the pen 200 may output the downlink signal DLS indicative of various pieces of additional information.

As described above, the downlink signal DLS output from the pen 200 may be applied to one or more common electrodes CE among the plurality of common electrodes CE of the display panel DISP.

The touch driving circuit TDC of the touchscreen display device 100 may receive the downlink signal DLS, output from the pen 200, through one or more common electrodes CE, detect at least one of the pen coordinates and the pen tilt, or a combination thereof, of the pen 200, on the basis of the received downlink signal DLS, and recognize various pieces of additional information regarding the pen 200.

The uplink signal ULS may be a signal waveform having periodically-repeating high and low levels or a signal waveform having aperiodically-repeating high and low levels.

The uplink signal ULS may be an information signal including information or a signal not including information.

In a case in which no information is included in the uplink signal ULS, all of high-level signal segments (or low-level signal segments) in the downlink signal DLS may have the same length (i.e. time length).

According to the information included in the uplink signal ULS, all of the high-level signal segments (or low-level signal segments) in the downlink signal DLS may have the same length (i.e. time length) or some of the high-level signal segments (or low-level signal segments) may have different lengths.

The uplink signal ULS may include, for example, a beacon signal or a ping signal.

The beacon signal is a control signal for defining the cooperative operation between the touchscreen display device 100 and the pen 200, controlling the driving operation of the pen 200, or including various pieces of information necessary for the driving operation of the pen 200.

The ping signal may be a synchronous control signal for synchronization of the downlink signal DLS.

The downlink signal DLS will also be referred to as a pen signal.

The downlink signal DLS may be a signal waveform having periodically-repeating high and low levels or a signal waveform having aperiodically-repeating high and low levels.

The downlink signal DLS may be an information signal including information or a signal not including information.

In a case in which no information is included in the downlink signal DLS, all of high-level signal segments (or low-level signal segments) in the downlink signal DLS may have the same length (i.e. time length).

According to the information included in the downlink signal DLS, all of the high-level signal segments (or low-level signal segments) in the downlink signal DLS may have the same length (i.e. time length) or some of the high-level signal segments (or low-level signal segments) may have different lengths.

Figure 11:
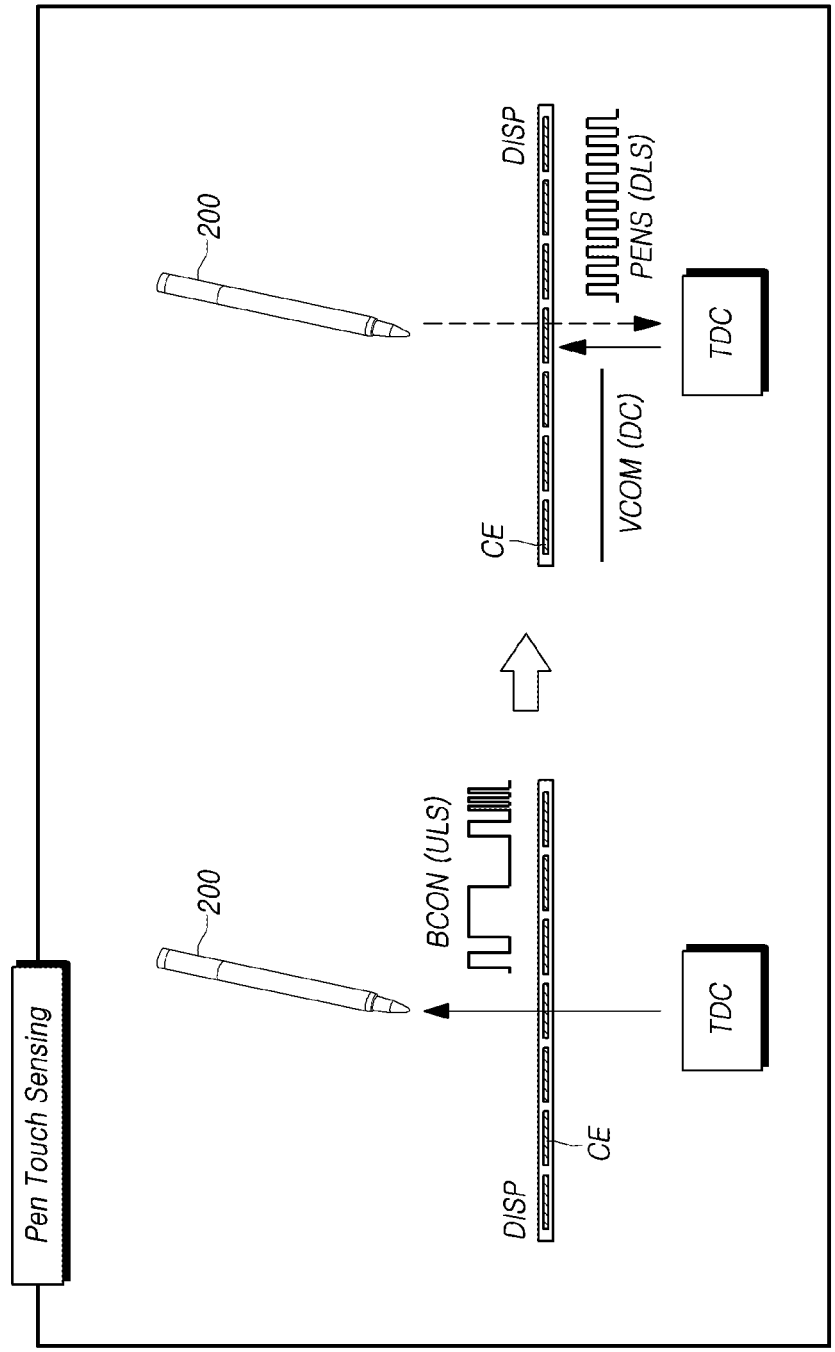
FIG. 11 is a diagram illustrating pen driving and panel driving for pen touch sensing in the touchscreen display device according to aspects.

FIG. 11 is a diagram illustrating pen driving and panel driving for pen touch sensing in the touchscreen display device 100 according to aspects.

Referring to FIG. 11, a step of transmitting, by the touchscreen display device 100, a beacon signal BCON, i.e. a type of uplink signal ULS, to the pen 200 is required for the pen touch sensing.

For example, the beacon signal BCON may include at least one of panel information (e.g. panel state information, panel identification information, or panel type information, such as an in-cell type), panel driving mode information (e.g. mode identification information, such as a pen search mode or a pen mode), characteristic information (e.g. the frequency or the number of pulses) of the downlink signal, driving timing-related information, multiplexer driving information, power mode information (e.g. LHB information regarding long horizontal blocks (LHBs) in which neither panel nor pen driving is not enabled to reduce power consumption), or combinations thereof. The beacon signal BCON may further include information for driving synchronization between the display panel DISP and the pen 200.

The beacon signal BCON may be a signal waveform having periodically (or regularly)-repeating high and low levels or a signal waveform having aperiodically-repeating high and low levels.

According to the information included in the beacon signal BCON, all of the high-level signal segments (or low-level signal segments) in the beacon signal BCON may have the same length (i.e. time length). Some of the high-level signal segments (or low-level signal segments) in the beacon signal BCON may have different lengths.

Referring to FIG. 11, when the beacon signal BCON, i.e. a type of uplink signal ULS, is received from the touchscreen display device 100, the pen 200 may output a pen signal PENS, i.e. a type of downlink signal DLS, in response to the beacon signal BCON.

The touch driving circuit TDC of the touchscreen display device 100 may detect the presence of the pen 200 or the position, tilt, pen information, and the like of the pen 200 by sensing the pen signal PENS, i.e. a downlink signal DLS, output from the pen 200 through one or more common electrodes CE in the display panel DISP.

The pen signal PENS may include a pen signal allowing the touchscreen display device 100 to detect at least one of the position and the tilt, or a combination thereof, of the pen 200, a pen information signal (also referred to as pen data or data) allowing the touchscreen display device 100 to detect pen information of the pen 200, and the like.

The pen signal PENS for detecting at least one of the position and the tilt, or a combination thereof, of the pen 200 may have a signal waveform having periodically (or regularly)-repeating high and low levels. That is, all of the high-level signal segments (or low-level signal segments) in the pen signal PENS for detecting at least one of the position and the tilt, or a combination thereof, of the pen 200 may have the same length (i.e. time length).

The pen signal PENS allowing the pen information to be detected may have a signal waveform having aperiodically-repeating high and low levels. That is, all of the high-level signal segments (or low-level signal segments) in the pen signal PENS allowing the pen information to be detected may have the same length (i.e. time length) or some of the high-level signal segments (or low-level signal segments) in the pen signal PENS may have different lengths.

The pen information included in the pen signal PENS may include, for example, at least one of a pen pressure, pen ID, button information, battery information, information for checking and correcting an information error, or combinations thereof.

Referring to FIG. 11, the beacon signal BCON may be a type of uplink signal ULS and correspond to the common voltage VCOM applied to one or more common electrodes CE.

Referring to FIG. 11, during a period in which the position, tilt, pen information, and the like of the pen 200 are detected, the common voltage VCOM applied to one or more common electrodes CE may be in the form of a signal having a varying voltage level or may be a DC voltage. That is, when the pen signal PENS, i.e. a downlink signal DLS, is output from the pen 200, the common electrodes CE in the display panel DISP may be in a state in which the common voltage VCOM in the form of an AC voltage is applied thereto or in a state in which the common voltage VCOM in the form of a DC voltage is applied thereto.

Figure 12:
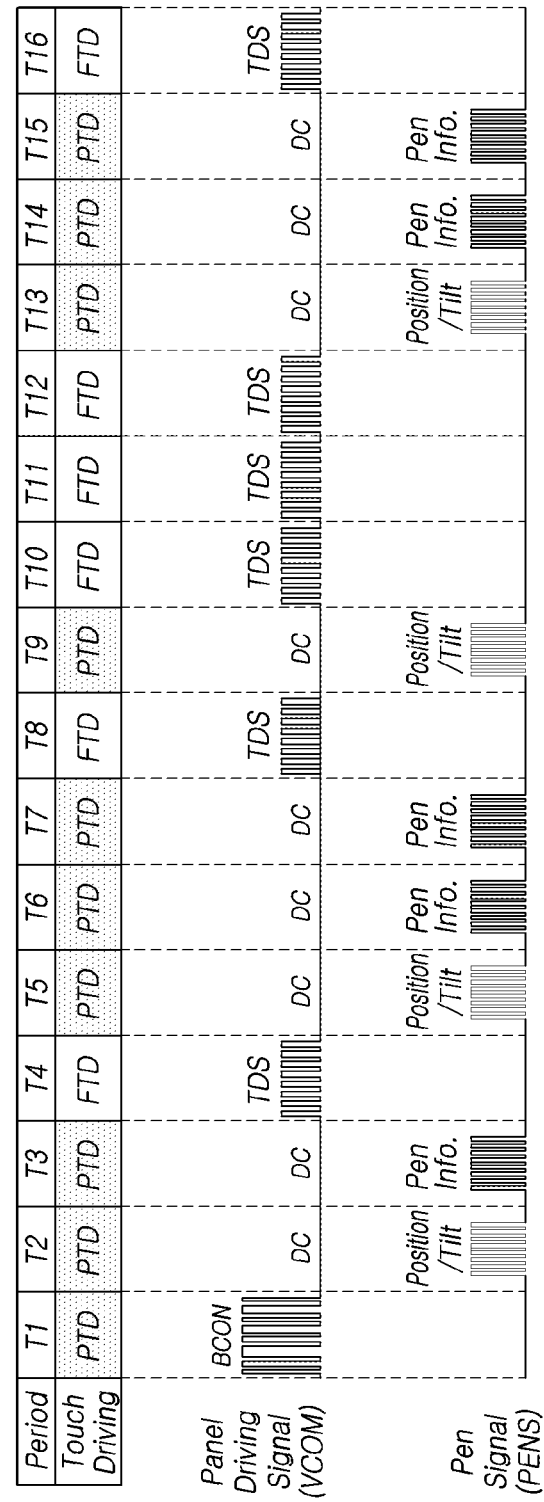
FIG. 12 is a driving timing diagram for finger touch sensing and pen touch sensing in the touchscreen display device according to aspects.

FIG. 12 is a driving timing diagram for finger touch sensing and pen touch sensing in the touchscreen display device according to aspects.

FIG. 12 illustrates an example in which sixteen (16) touch driving periods T1 to T16 are regularly repeated. A total of the 16 touch driving periods T1 to T16 may be regarded as a single touch frame period. In the example of FIG. 12, both the finger touch sensing and the pen touch sensing may be performed during the single touch frame period. The touch frame period may be the same as or different from the display frame time.

Referring to FIG. 12, the 16 touch driving periods T1 to T16 may include touch driving periods (e.g. T1, T2, T3, T5, T6, T7, T9, T13, T14, and T15) in which pen touch driving PTD for sensing a pen touch is performed and touch driving periods (e.g. T4, T8, T10, T11, T12, and T16) in which finger touch driving FTD for sensing a finger touch is performed. Herein, the touch driving periods (e.g. T1, T2, T3, T5, T6, T7, T9, T13, T14, and T15) in which the pen touch driving PTD is performed will be referred to as a pen touch driving period or a pen touch sensing period. The touch driving periods (e.g. T4, T8, T10, T11, T12, and T16) in which the finger touch driving FTD is performed will be referred to as a finger touch driving period or a finger touch sensing period.

FIG. 12 illustrates the pen signal PENS, i.e. the downlink signal DLS, output from the pen 200 and a variety of signals (including the uplink signal USL) supplied to the display panel DISP by the touch driving circuit TDC, depending on points in time previously determined by the protocol.

Referring to FIG. 12, during a single touch frame period corresponding to the 16 touch driving periods T1 to T16, the beacon signal BCON, i.e. a type of the uplink signal ULS, may be transmitted to the pen 200 by the display panel DISP one or more times. The beacon transmission period may be one or more the touch driving period (T1 in FIG. 12) previously determined by the protocol from among the 16 touch driving periods T1 to T16.

In addition, the beacon signal BCON may be periodically transmitted in every touch frame period, every two touch frame periods, or every random touch frame period according to the occurrence of a predetermined event or the like.

When the beacon signal BCON is transmitted to the pen 200 by the display panel DISP, the pen 200 may output the downlink signal DLS to the touch driving periods (T2, T3, T5, T6, T7, T9, T13, T14, and T15 in FIG. 12) previously determined by the preset protocol, in response to the beacon signal BCON.

The pen signal PENS, i.e. the downlink signal DLS, output from the pen 200 may be a signal allowing the touchscreen display device 100 to detect the coordinates (or position) and the tilt of the pen 200.

For example, the pen signal PENS output from the pen 200 may be a signal allowing the touchscreen display device 100 to detect the coordinates or the tilt of the pen 200 or a signal allowing the touchscreen display device 100 to detect both the coordinates and the tilt of the pen 200.

In addition, the pen signal PENS output from the pen 200 may be a signal indicative of various pieces of pen information Pen Info of the pen 200. The pen information Pen Info may include, for example, a pen pressure, pen ID, button information, battery information, information for checking and correcting an information error, and the like.

The pen signal PENS, i.e. the downlink signal DLS, output from the pen 200 may be applied to one or more common electrodes CE among the plurality of common electrodes CE of the display panel DISP.

In addition, referring to FIG. 12, the 16 touch driving periods T1 to T16 included in the single touch frame period may include one or more touch driving periods (e.g. T2, T5, T9, and T13) in which at least one of the pen coordinates and pen tilt, or a combination thereof, is detected.

Synchronously with the touch driving periods (e.g. T2, T5, T9, and T13), the pen 200 may output the pen signal PENS, i.e. the downlink signal DLS related to the detection of at least one of the pen coordinates and pen tilt, or a combination thereof. In this case, the pen signal PENS may be a signal comprised of pulses periodically swinging between high and low levels.

In addition, referring to FIG. 12, the 16 touch driving periods T1 to T16 may include one or more touch driving periods (e.g. T3, T6, T7, T14, and T15) in which data may be sensed.

Synchronously with the touch driving periods (e.g. T3, T6, T7, T14, T15), the pen 200 may output the pen signal PENS for detection of the pen information. In this case, the pen signal PENS may be a signal comprised of aperiodic pulses representing corresponding pen information.

As described above, when the pen signal PENS is output from the pen 200 synchronously with the touch driving periods defined by the protocol, the touch driving circuit TDC may receive the pen signal PENS through the display panel DISP and process the pen touch sensing on the basis of the received pen signal PENS.

The processing of the pen touch sensing may include at least one of detecting pen coordinates, detecting a pen tilt, recognizing pen information, or combinations thereof.

The 16 touch driving periods T1 to T16 included in the single touch frame period may include one or more touch driving periods (e.g. T4, T8, T10, T11, T12, and T16) in which the finger touch is sensed.

During the touch driving periods (e.g. T4, T8, T10, T11, T12, T16) corresponding to such finger touch sensing periods, the touch driving circuit TDC may supply the common voltage VCOM having a predetermined amplitude, a predetermined frequency, and a variable voltage level to the entirety or some of the plurality of common electrodes CE of the display panel DISP in order to detect the finger touch. The common voltage VCOM supplied to the entirety or some of the plurality of common electrodes CE in the finger touch sensing period may be referred to as a touch driving signal TDS.

The touch driving signal TDS may be a signal swinging between high and low levels in a predetermined manner. That is, the touch driving signal TDS may be a modulation signal having a variable voltage level.

In addition, during the remaining touch driving periods (e.g. T2, T3, T5, T6, T7, T9, T13, T14, T15) except for the touch driving period (e.g. T1) corresponding to the beacon transmission period from among the touch driving periods (e.g. T1, T2, T3, T5, T6, T7, T9, T13, T14, T15) in which the pen touch is sensed, the touch driving circuit TDC may supply the common voltage VCOM in the form of a DC voltage having a constant voltage level to the display panel DISP.

Here, the voltage value of the common voltage VCOM in the form of a DC voltage may be a low-level voltage, such as the touch driving signal TDS or the beacon signal BCON, any voltage between a low-level voltage and a high level voltage, or a ground voltage.

Figure 13:
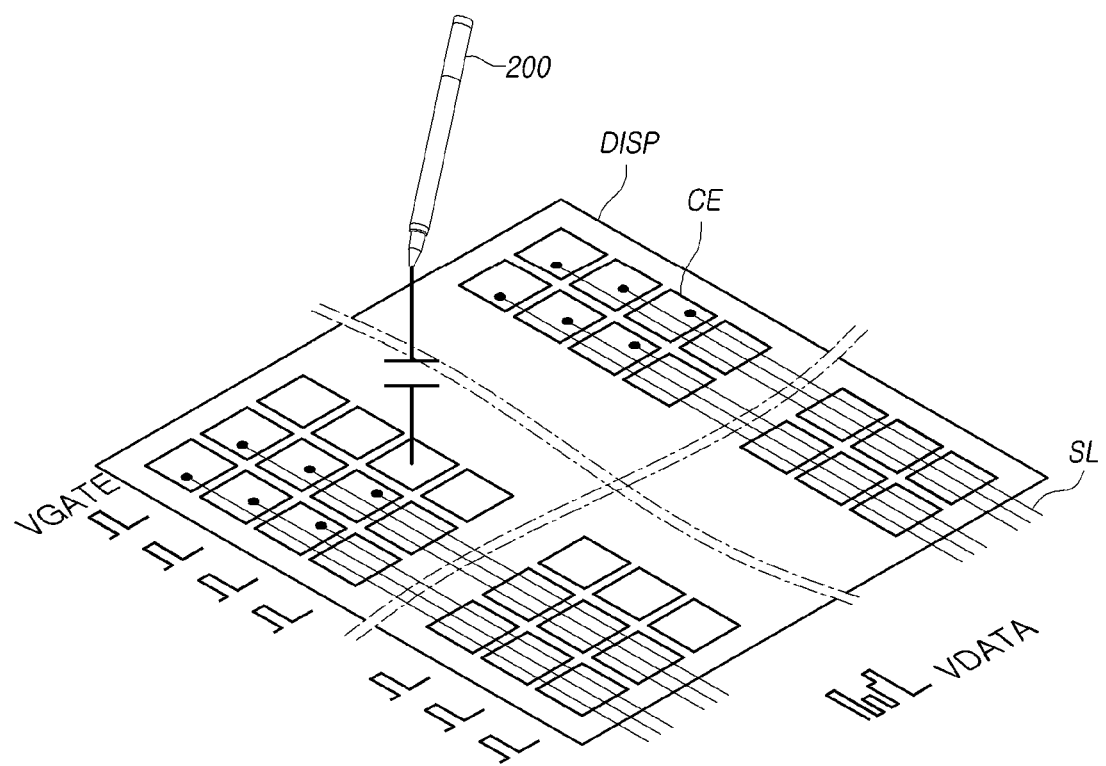
FIGS. 13 to 15 are diagrams illustrating panel interior noise occurring during simultaneous driving in the touchscreen display device 100 according to aspects.
Figure 14:
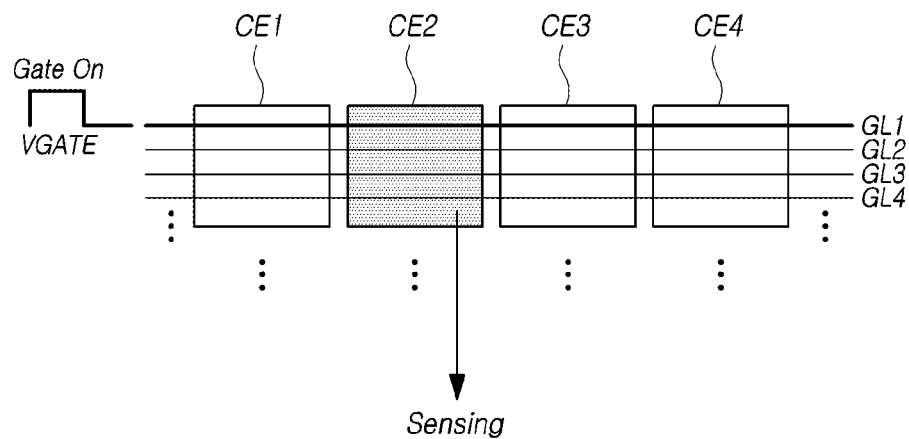
Figure 15:
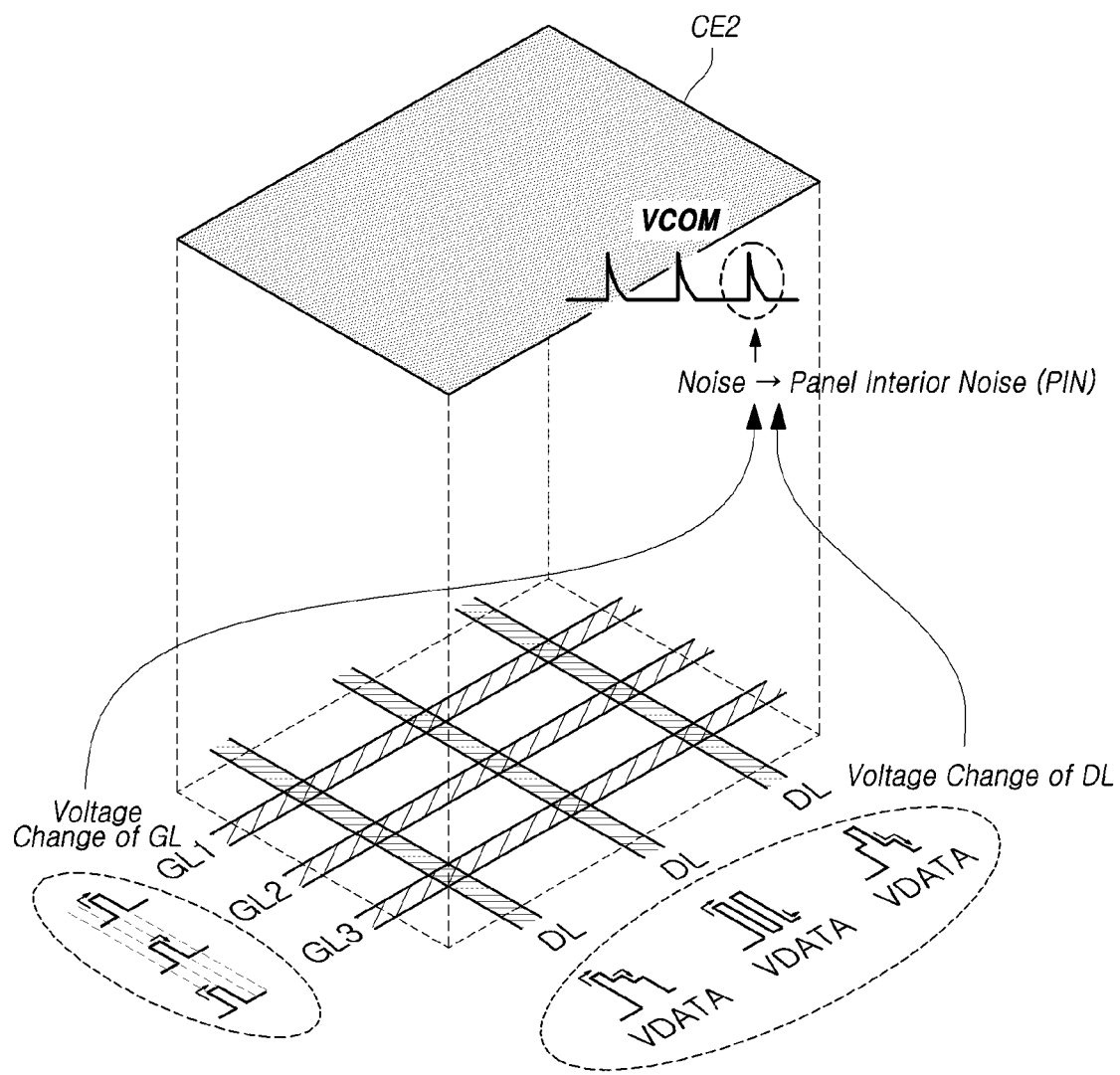

FIGS. 13 to 15 are diagrams illustrating panel interior noise occurring during simultaneous driving in the touch-screen display device 100 according to aspects.

Referring to FIG. 13, a plurality of data lines DL, a plurality of gate lines GL, a plurality of common electrodes CE, a plurality of signal lines SL, and the like may be disposed in the display panel DISP.

Each of the plurality of common electrodes CE may overlap with two or more subpixels SP.

Each of the plurality of common electrodes CE may overlap with two or more data lines DL and two or more gate lines GL. In addition, each of the plurality of common electrodes CE may overlap with two or more pixel electrodes PXL.

Accordingly, the common electrodes CE may generate capacitors together with the data lines DL, generate capacitors together with the gate lines GL, and capacitors together with the pixel electrodes PXL.

The capacitors generated between the common electrodes CE and the pixel electrodes PXL are essentially required for display driving of storage capacitors. However, the capacitors generated between the common electrodes CE and the data lines DL and the capacitors generated between the common electrodes CE and the gate lines GL are unnecessary for the display driving.

Due to the structure in which each of the plurality of common electrodes CE overlaps with the corresponding data lines DL, the corresponding gate lines GL, and the corresponding pixel electrodes PXL, a change in the voltage of at least one of the data lines DL, the gate lines GL, the pixel electrodes PXL, or combinations thereof may have an effect on the voltage state of the common electrode CE.

Although the change in the voltage of at least one of the data lines DL, the gate lines GL, the pixel electrodes PXL, or combinations thereof is essentially required for the display driving, the change in the voltage of the common electrode CE induced by the change in the voltage of at least one of the data lines DL, the gate lines GL, the pixel electrodes PXL, or combinations thereof may be a reason for reducing touch sensitivity.

The change in the voltage of at least one of the data lines DL, the gate lines GL, the pixel electrodes PXL, or combinations thereof, able to reduce touch sensitivity, will be referred to as panel interior noise, i.e. noise occurring within the panel. Due to the panel interior noise, the common voltage VCOM may not be applied to the common electrode CE, but the common electrode CE may have an unintended different voltage (i.e. common voltage noise).

Hereinafter, the panel interior noise and the resultant touch sensitivity will be described in more detail.

Referring to FIG. 14, when the display driving and the pen touch driving are simultaneously performed, a common voltage VCOM in the form of a DC voltage is applied to common electrodes CE1, CE2, CE3, CE4, and . . . , so as to drive the common electrodes CE1, CE2, CE3, CE4, and . . . .

The touch driving circuit TDC senses the entirety or some of the common electrodes CE1, CE2, CE3, CE4, and . . . to detect a pen touch when the display driving and the pen touch driving are simultaneously performed. In the illustration of FIG. 14, the second common electrode CE2 among the common electrodes CE1, CE2, CE3, CE4, and . . . is a target common electrode selected as a sensing target.

As described above, some gate lines GL1, GL2, GL3, GL4, and . . . disposed in the display panel DISP may overlap with the common electrodes CE1, CE2, CE3, CE4, and . . . disposed in a single row.

In a case in which the display driving and the pen touch driving are performed simultaneously, when the target common electrode CE2 selected as a sensing target from among the common electrodes CE1, CE2, CE3, CE4, and . . . is sensed, a turn-on-level gate signal VGATE may be applied to the first gate line GL1 from among two or more gate lines GL1, GL2, GL3, GL4, and . . . overlapping with the target common electrode CE2 selected as a sensing target, thereby driving the first gate line GL1 (i.e. turn-on driving).

In this case, the transistor TR in the subpixel SP connected to the first gate line GL1 is turned on by the gate signal VGATE. Accordingly, the data signal VDATA supplied to the data line DL is applied to the pixel electrode PXL through the transistor TR.

In other words, referring to FIGS. 14 and 15, during a period in which the target common electrode CE2 selected as a sensing target is sensed, a change in the voltage between the turn-off-level gate voltage VGL and the turn-on-level gate voltage VGH may occur in the first gate line GL1 so that the first gate line GL1 is driven.

Referring to FIGS. 14 and 15, during a period in which the target common electrode CE2 is sensed, the data signal VDATA may cause a voltage change in the corresponding data line DL and the corresponding pixel electrode PXL.

Referring to FIGS. 14 and 15, during a period in which the target common electrode CE2 is sensed, the change in the voltage of the first gate line GL1 and the change in the voltage of the data line DL and the pixel electrode PXL may cause an unintended change in the common voltage VCOM applied to the target common electrode CE2 selected as a sensing target.

Referring to FIGS. 14 and 15, during a period in which the target common electrode CE2 is sensed, a change in the voltage of the first gate line GL1 and a change in the voltage of the data line DL and the pixel electrode PXL are necessary for the display driving, but in the target common electrode CE2 selected as a sensing target, may act as noise (i.e. panel interior noise PIN) causing an unintended voltage state.

In other words, the change in the voltage (i.e. panel interior noise PIN) of the first gate line GL1, the data line DL, and the pixel electrode PXL, generated by the display driving, may cause a noise voltage CEN in the target common electrode CE2 overlapping with the first gate line GL1, the data line DL, and the pixel electrode PXL and selected as a sensing target. Accordingly, the pen touch sensitivity of the sensing of the target common electrode CE2 may be reduced.

Figure 16:
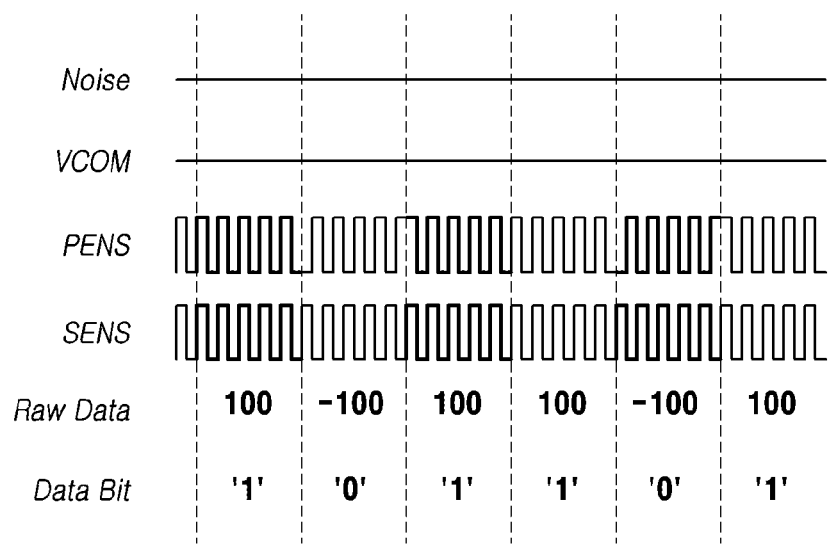
FIG. 16 is a diagram illustrating pen touch sensing in the touchscreen display device according to aspects in an environment without the panel interior noise.
Figure 17:
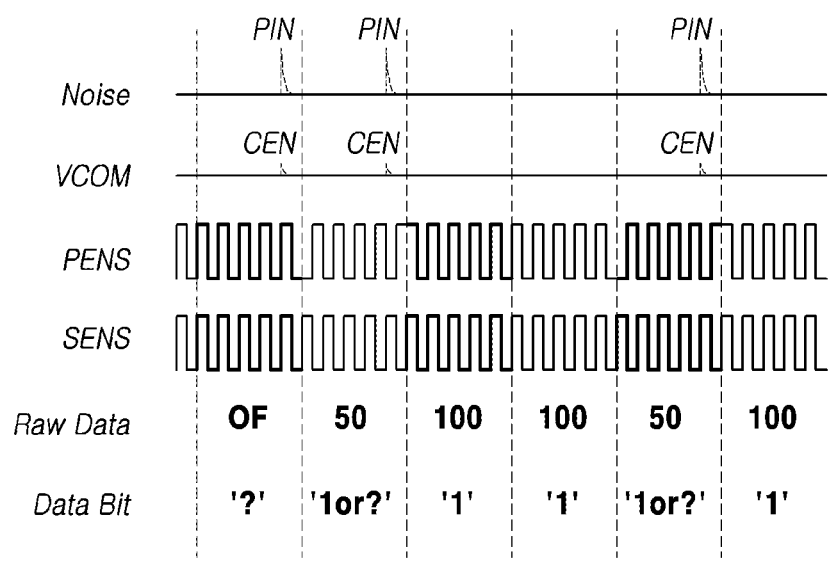
FIG. 17 is a diagram illustrating reduced sensitivity in pen touch sensing in the touchscreen display device according to aspects in an environment having the panel interior noise.

FIG. 16 is a diagram illustrating pen touch sensing in the touchscreen display device 100 according to aspects in an environment without the panel interior noise PIN. FIG. 17 is a diagram illustrating reduced sensitivity in pen touch sensing in the touchscreen display device 100 according to aspects in an environment having the panel interior noise PIN.

For the sake of brevity, in the illustration of FIGS. 16 and 17, the pen 200 outputs the pen signal PENS indicative of pen information, and the touchscreen display device 100 obtains the pen information by sensing the pen signal PENS.

Referring to FIG. 16, in a state in which the common voltage VCOM having a constant voltage level is applied to the plurality of common electrodes CE, the pen touch sensing is performed. In a case in which the pen touch sensing is performed in the environment without the panel interior noise PIN, the plurality of common electrodes CE maintain the common voltage VCOM having a constant voltage level.

Referring to FIG. 16, the touch driving circuit TDC receives the pen signal PENS output from the pen 200 through one or more common electrodes CE and obtains raw data Raw Data on the basis of a sensing value SENS obtained by sensing the input pen signal PENS. As illustrated FIG. 16, in the case of the environment without the panel interior noise PIN, the obtained raw data Raw Data may include normal values 100, −100, 100, 100, −100, and 100 and indicate normal data bits (1 0 1 1 0 1).

Referring to FIG. 17, in a case in which the pen touch sensing is performed in the environment having the panel interior noise PIN, the plurality of common electrodes CE have a voltage different from the common voltage VCOM, instead of maintaining the common voltage VCOM having a constant voltage level. The voltage different from the intended common voltage VCOM corresponds to noise CEN produced in the common electrode CE.

Referring to FIG. 17, the touch driving circuit TDC receives the pen signal PENS output from the pen 200 through one or more common electrodes CE in which the noise CEN is produced, and obtains the raw data Raw Data on the basis of the sensing value SENS obtained by sensing the input pen signal PENS. The touch driving circuit TDC sensing the common electrode CE is the same as the touch driving circuit TDC sensing the pen signal PENS input through the common electrode CE.

As illustrated in FIG. 17, in the environment having the panel interior noise PIN, values OF, 50, and 50 corresponding to points in time at which the noise CEN is produced, among values OF, 50, 100, 100, 50, and 100 included in the obtained raw data Raw Data, correspond to abnormal values. The abnormal values OF, 50, and 50 may not be represented by data bits or may be abnormal data bits.

In other words, during the pen touch sensing period in which a pen touch is detected during the display driving, the display driving causes a change in the voltage of at least one of the internal components (e.g. DL, GL, and PXL) of the display panel DISP.

The change in the voltage produced from the internal component (e.g. DL, GL, or PXL) of the display panel DISP in the display driving is necessary for the display driving (e.g. data driving or gate driving) for grayscale expression (i.e. image display) in the subpixels SP, but may act as noise in the common electrodes CE serving as the touch electrodes for the pen touch sensing.

The change in the voltage produced from the internal component (e.g. DL, GL, or PXL) of the display panel DISP in the display driving may be a type of noise in terms of the pen touch sensing and be referred to as the panel interior noise PIN.

The panel interior noise PIN may cause an abnormal noise voltage CEN in the common electrode CE, to which the common voltage VCOM in the form of a DC voltage (having a constant voltage level) for the pen touch sensing has been applied, and significantly reduce the pen touch sensitivity.

While the pen touch sensing is being performed during the display driving, the panel interior noise PIN induces the abnormal noise voltage CEN in the common electrode CE. Thus, a situation in which the pen touch sensitivity is reduced occurs when the target common electrode CE2 to be sensed and the gate line GL1 to be gate-on-driven overlap with each other. This is illustrated in FIG. 14.

Hereinafter, a pen touch sensing method will be described. While the pen touch sensing is being performed during the display driving, the pen touch sensing method may prevent the pen touch sensitivity from being reduced even when the panel interior noise PIN induces the abnormal noise voltage in the common electrode CE.

Hereinafter, for the sake of brevity, a structure in which first to eighth gate lines GL1 to GL8 are sequentially disposed, first to fourth common electrodes CE1, CE2, CE3, and CE4 are disposed in a first row, and fifth to eighth common electrodes CE5, CE6, CE7, and CE8 are disposed in a second row directly below the first row will be taken as an example. In addition, each of the first to fourth common electrodes CE1, CE2, CE3, and CE4 overlaps with the first to fourth gate lines GL1, GL2, GL3, and GL4, and each of the fifth to eighth common electrodes CE5, CE6, CE7, and CE8 overlaps with the fifth to eighth gate lines GL5, GL6, GL7, and GL8.

FIGS. 18A, 18B, 19A, and 19B are diagrams illustrating the pen touch sensing method for removing or reducing the panel interior noise PIN in the simultaneous driving of the touchscreen display device 100 according to aspects. FIG. 20 is a diagram illustrating an improvement in pen touch sensitivity realized by the pen touch sensing method for removing or reducing the panel interior noise PIN in the simultaneous driving of the touchscreen display device 100 according to aspects.

Referring to FIGS. 18A, 18B, 19A, and 19B, during the pen touch sensing period simultaneous with the display driving for displaying images, the touch driving circuit TDC of the touchscreen display device 100 according to aspects drives the entirety or some of the plurality of common electrodes CE1 to CE8 and receives the pen signal PENS output from the pen 200 through the common electrode CE2 selected as a sensing target from among the plurality of common electrodes CE1 to CE8.

Hereinafter, the common electrode CE2 selected as a sensing target from among the plurality of common electrodes CE1 to CE8 will be referred to as a "target common electrode".

The touch driving circuit TDC may perform sensing processing on the pen signal PENS input through the target common electrode CE2 in a different manner, depending on whether or not the gate line GL through which the gate signal VGATE having a variable voltage is applied overlaps with the target common electrode CE2, and generate and output sensing data according to the result of the sensing processing.

One or more pen touch sensing periods may be present in a display frame time. The pen touch sensing period may be simultaneous with the display driving. Referring to the illustration of FIG. 12, a plurality of pen touch sensing periods T1, T2, T3, T5, T6, T7, T9, T13, and T14 may be present during a single display frame time.

The change in the voltage of the gate signal VGATE is a voltage change occurring in the gate lines GL1 to GL8 in response to the scanning of the gate lines GL1 to GL8.

The change in the voltage of the gate signal VGATE may include a change from the turn-off-level gate voltage VGL to the turn-on-level gate voltage VGH and a change from the turn-on-level gate voltage VGH to the turn-off-level gate voltage VGL.

The touch driving circuit TDC may perform (i) sensing processing on signal segments of the pen signal PENS or (ii) sensing processing on the signal segments of the pen signal PENS, except for some signal segments of the pen signal PENS, depending on whether or not the gate line GL through which the gate signal VGATE having a variable voltage level is applied overlaps with the target common electrode CE2, and generate and output sensing data to the touch controller TCTR according to the result of the sensing processing.

The touch controller TCTR may detect at least one of the presence, position, tilt, pen information, or combinations thereof, of the pen 200, on the basis of the sensing data.

The touch driving circuit TDC may perform (i) sensing processing on the entirety of the plurality of pulses of the pen signal PENS or (ii) sensing processing on the pulses (or signal segments) of the pen signal PENS, except for at least one pulse (or some signal segments) of the pen signal PENS, depending on whether or not the gate line GL through which the gate signal VGATE having a variable voltage level is applied overlaps with the target common electrode CE2, and generate and output sensing data according to the result of the sensing processing.

Figure 18A:
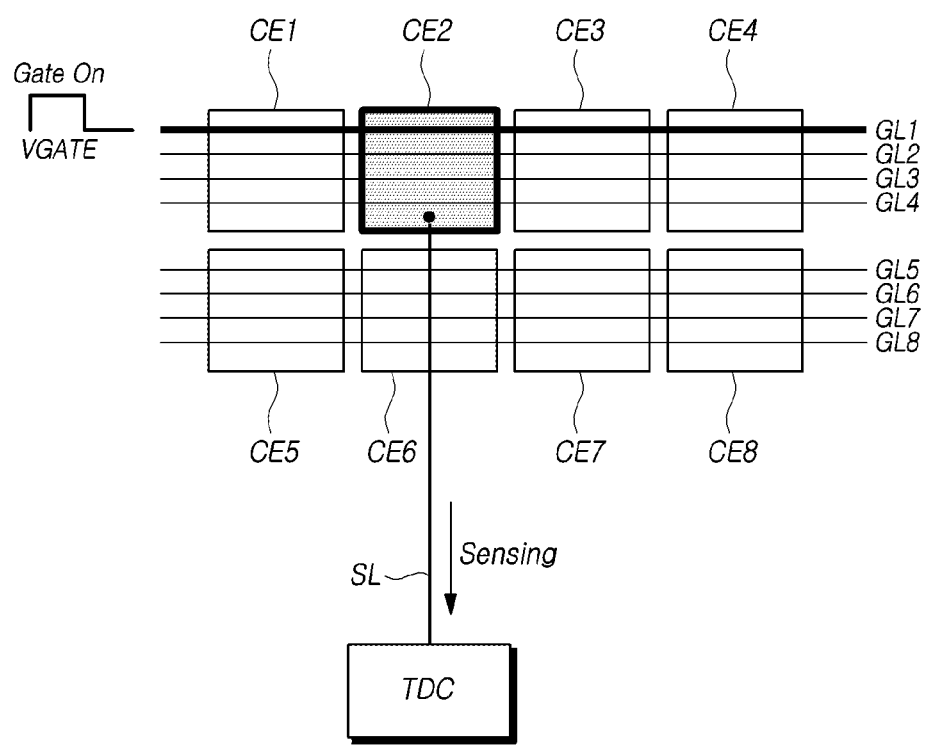
FIGS. 18A, 18B, 19A, and 19B are diagrams illustrating a pen touch sensing method for removing or reducing panel interior noise in simultaneous driving of the touchscreen display device according to aspects.
Figure 18B:
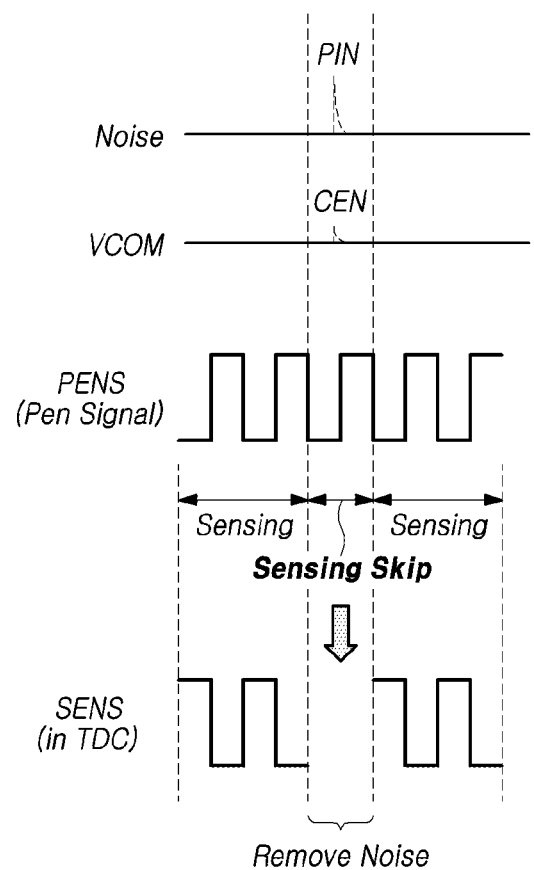

Referring to FIGS. 18A and 18B, in a case in which the gate line GL1 through which the gate signal VGATE having a variable voltage level is applied overlaps with the target common electrode CE2, the touch driving circuit TDC may skip the sensing processing on some signal segments among the signal segments (i.e. entire signal segments) of the pen signal PENS while performing the sensing processing on the remaining signal segments.

In other words, in a case in which the gate line GL1 through which the gate signal VGATE having a variable voltage level is applied overlaps with the target common electrode CE2, the touch driving circuit TDC may skip the sensing processing on some pulses (or some signal segments) among the entire pulses (or the entire signal segments) of the pen signal PENS while performing the sensing processing on the remaining pulses.

The touch driving circuit TDC performs sensing skip processing at points in time at which the panel interior noise PIN occurs, but does not perform the sensing processing on some signal segments among the signal segments (i.e. entire signal segments) of the pen signal PENS. Thus, the sensing value SENS obtained by the sensing processing performed on the pen signal PENS includes the sensing value of the remaining signal segments on which the sensing processing is performed, without including the sensing value of some signal segments on which the sensing skip processing is performed (i.e. some signal segments on which the sensing processing is not performed).

Referring to FIGS. 18A and 18B, since operation time points of the data lines DL and/or the gate lines GL in the display panel DISP are determined, occurrence periods of the panel interior noise PIN may be predicted in advance. Accordingly, the touch driving circuit TDC may perform the sensing skip processing in the predicted periods.

Figure 19A:
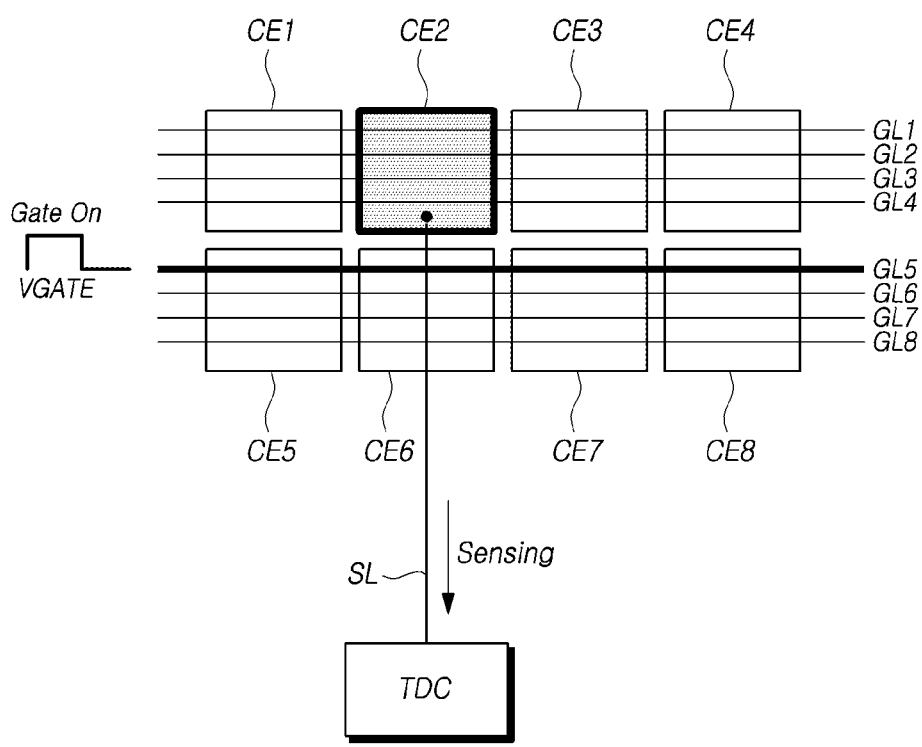
Figure 19B:
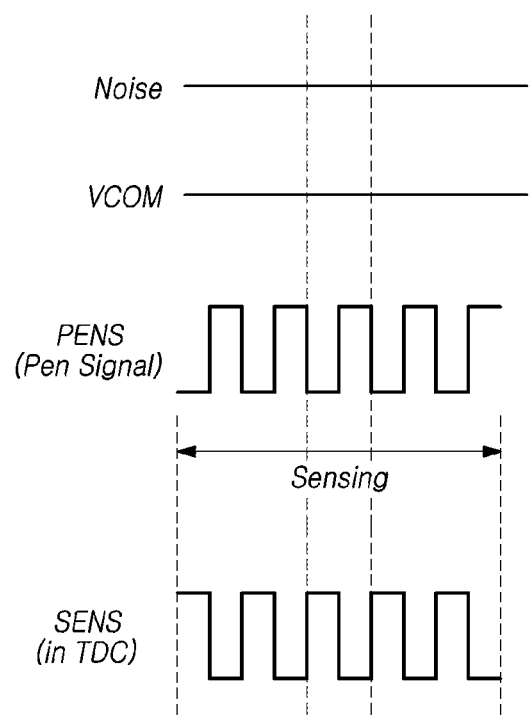
Figure 20:
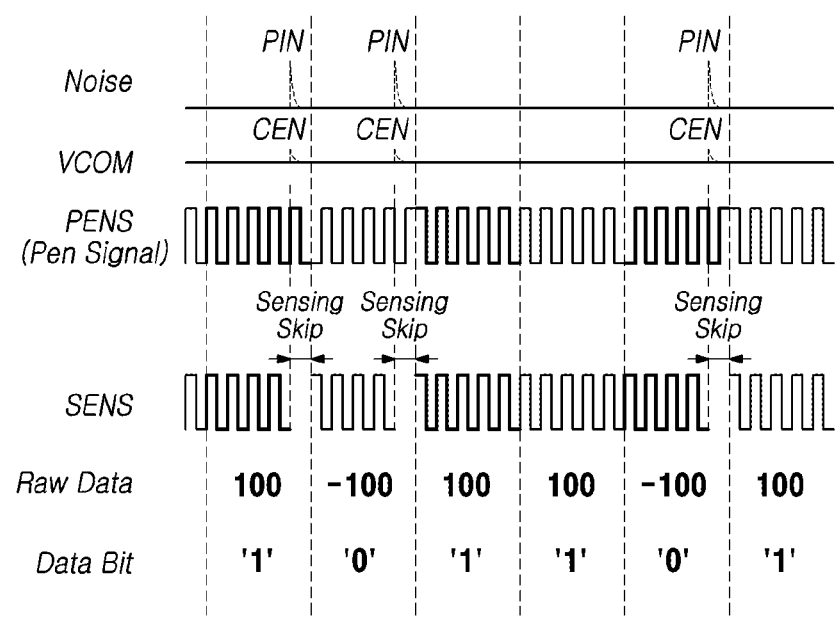
FIG. 20 is a diagram illustrating an improvement in pen touch sensitivity realized by the pen touch sensing method for removing or reducing panel interior noise in simultaneous driving of the touchscreen display device according to aspects.

Referring to FIGS. 19A and 19B, in a case in which the gate line GL5 through which the gate signal VGATE having a variable voltage level is applied does not overlap with the target common electrode CE2, the touch driving circuit TDC may perform the sensing processing on the signal segments (i.e. entire signal segments) of the pen signal PENS.

In other words, in a case in which the gate line GL5 through which the gate signal VGATE having a variable voltage level is applied does not overlap with the target common electrode CE2, the touch driving circuit TDC may perform the sensing processing on the plurality of pulses (or the entire signal segments) of the pen signal PENS.

As the panel interior noise PIN is not produced, the touch driving circuit TDC performs the sensing processing on the signal segments (i.e. entire signal segments) of the pen signal PENS, instead of performing the sensing skip processing. Accordingly, the sensing value SENS obtained by performing the sensing processing on the pen signal PENS includes the sensing value of the entire signal segments.

Referring to FIGS. 18A and 18B, in a case in which the gate line GL1 through which the gate signal VGATE having a variable voltage level is applied overlaps with the target common electrode CE2, a change in the voltage of the gate line GL1 corresponds to the panel interior noise PIN causing the abnormal noise voltage CEN in the target common electrode CE2.

Referring to FIGS. 18A and 18B, in a case in which the gate line GL1 through which the gate signal VGATE having a variable voltage level is applied overlaps with the target common electrode CE2, the target common electrode CE2 may overlap with the data line DL through which the data signal VDATA having a variable voltage is applied in order to display images.

Referring to FIGS. 18A and 18B, in a case in which the gate line GL1 through which the gate signal VGATE having a variable voltage level is applied overlaps with the target common electrode CE2, the target common electrode CE2 may overlap with the pixel electrode PXL to which the data signal VDATA having a variable voltage is applied in order to display images through the transistor TR turned on by the gate signal VGATE.

Referring to FIGS. 18A and 18B, in a case in which the gate line GL1 through which the gate signal VGATE having a variable voltage level is applied overlaps with the target common electrode CE2, the target common electrode CE2 may be in a state in which a voltage different from the intended common voltage VCOM is abnormally applied thereto.

The "voltage different from the intended common voltage VCOM" as mentioned above may correspond to the abnormal noise voltage CEN induced in the target common electrode CE2 by the panel interior noise PIN and be in the form of a peak.

Referring to FIGS. 19A and 19B, in a case in which the gate line GL5 through which the gate signal VGATE having a variable voltage level is applied does not overlap with the target common electrode CE2, the target common electrode CE2 is in a state in which the intended common voltage VCOM is properly applied thereto.

Referring to FIG. 20, in a case in which the gate line GL through which the gate signal VGATE having a variable voltage level is applied overlaps with the target common electrode CE2, the touch driving circuit TDC may perform the sensing skip processing so that some signal segments of the pen signal PENS skip the sensing processing at points in time at which the panel interior noise PIN occurs, thereby obtaining the sensing data (i.e. raw data) and the pen information bits (i.e. data bits) the same as the sensing data (i.e. raw data) and the pen information bits (i.e. data bits) obtained in the environment in which the panel interior noise PIN is absent (see FIG. 16). That is, the sensing skip processing may prevent noise from occurring in the sensing data.

In addition, as described above with reference to FIGS. 6 and 12, a single display frame time may include at least one pen touch sensing period in which the pen touch is sensed and at least one finger touch sensing period in which the finger touch is sensed.

During the pen touch sensing period, the common voltage VCOM in the form of a DC voltage having a constant voltage level may be applied to the entirety or some of the plurality of common electrodes CE1 to CE8.

During the finger touch sensing period, the common voltage VCOM having a variable voltage level may be applied to the entirety or some of the plurality of common electrodes CE1 to CE8. The common voltage VCOM during the finger touch sensing period will also be referred to as the "touch driving signal TDS".

As described above, in a case in which the common voltage VCOM having a variable voltage level is applied to the common electrodes CE having dual functions (i.e. a function as the touch electrodes and a function as the display driving electrodes), the data signal VDATA and the gate signal VGATE must be modified into the signals illustrated in FIG. 7 or 8, depending on the waveform (e.g. amplitude) of the common voltage VCOM.

Figure 21:
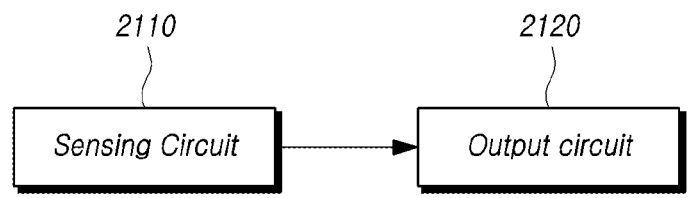
FIG. 21 is a schematic diagram illustrating the touch driving circuit of the touchscreen display device according to aspects.

FIG. 21 is a schematic diagram illustrating the touch driving circuit TDC of the touchscreen display device 100 according to aspects.

Referring to FIG. 21, the touch driving circuit TDC of the touchscreen display device 100 according to aspects may include a sensing circuit 2110 sensing one or more common electrodes CE and an output circuit 2120 generating and outputting sensing data according to the result of the sensing processing of the sensing circuit 2110.

The sensing circuit 2110 of the touch driving circuit TDC may include the first multiplexer circuit MUX1 and the sensing unit block SUB illustrated in FIG. 4. The output circuit 2120 may include the analog-to-digital converter (ADC) illustrated in FIG. 4. The second multiplexer circuit MUX2 illustrated in FIG. 4 may be included in the sensing circuit 2110 or the output circuit 2120.

During the pen touch sensing period present simultaneously with the display driving, the sensing circuit 2110 of the touch driving circuit TDC drives the entirety or some of the plurality of common electrodes CE and receives the pen signal PENS output from the pen 200 through at least one target common electrode CE, i.e. at least one common electrode CE selected as a sensing target from among the plurality of common electrodes CE.

The sensing circuit 2110 of the touch driving circuit TDC may differently perform the sensing processing on the pen signal PENS input through the target common electrode CE, depending on whether or not the gate line GL through which the gate signal VGATE having a variable voltage level is applied overlaps with the target common electrode CE.

The sensing circuit 2110 of the touch driving circuit TDC may perform the sensing processing on the signal segments of the pen signal PENS or may skip the sensing processing on some signal segments of the pen signal PENS while performing the sensing processing on the remaining signal segments, depending on whether or not the gate line GL through which the gate signal VGATE having a variable voltage level is applied overlaps with the target common electrode CE.

In a case in which the gate line GL1 through which the gate signal VGATE having a variable voltage level is applied overlaps with the target common electrode CE or the common electrode CE selected as a sensing target (FIG. 18A), the sensing circuit 2110 of the touch driving circuit TDC may skip the sensing processing on some signal segments of the pen signal PENS while performing the sensing processing on the remaining signal segments.

In a case in which the gate line GL5 through which the gate signal VGATE having a variable voltage level is applied does not overlap with the target common electrode CE (FIG. 19A), the sensing circuit 2110 of the touch driving circuit TDC may perform the sensing processing on the signal segments of the pen signal PENS.

Figure 22:
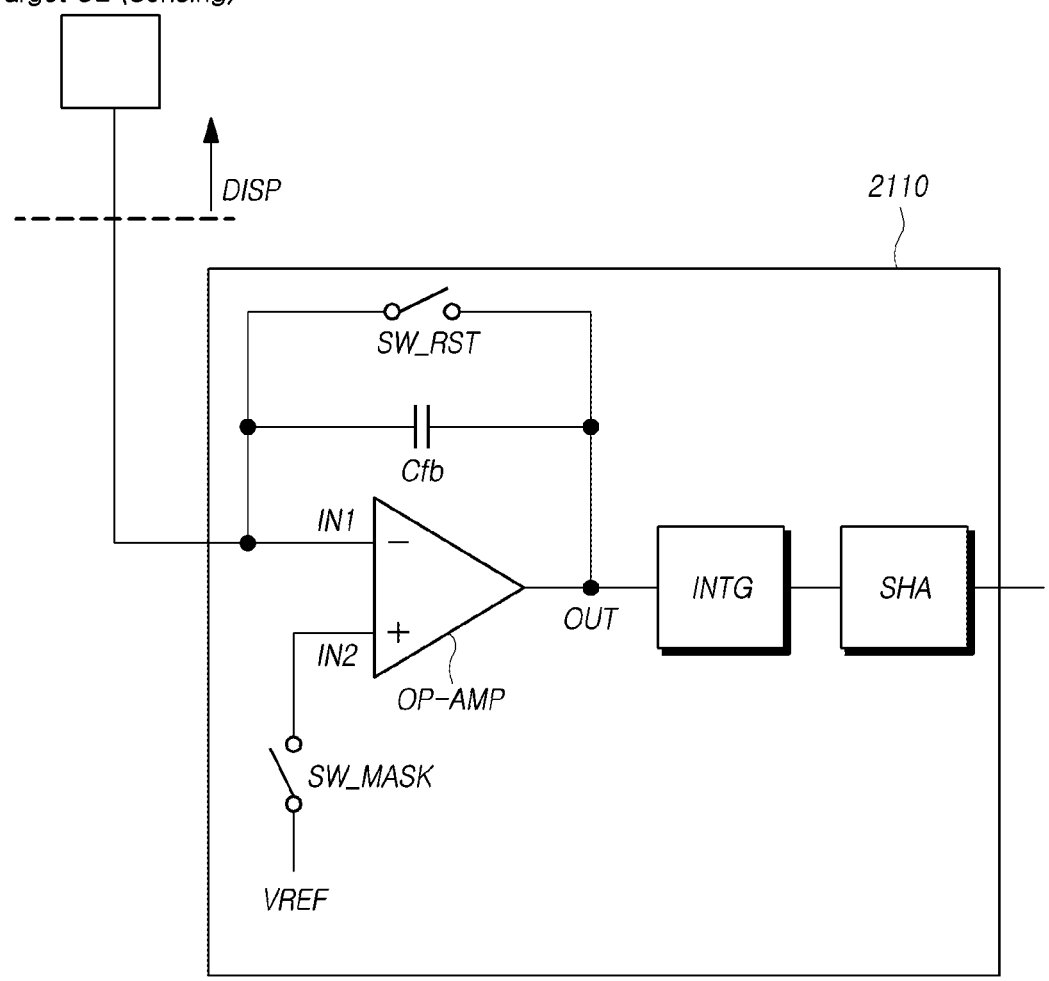
FIG. 22 is a more detailed diagram illustrating the touch driving circuit of the touchscreen display device according to aspects.

FIG. 22 is a more detailed diagram illustrating the touch driving circuit TDC of the touchscreen display device 100 according to aspects.

Referring to FIG. 22, the sensing circuit 2110 of the touch driving circuit TDC may include an operation amplifier OP-AMP, a feedback capacitor Cfb, a reset switch SW_RST, and the like.

The operation amplifier OP-AMP may include a first input port IN1 electrically connected to a target common electrode Target CE, a second input port IN2 through which a reference voltage VREF is input, and an output port OUT through which an output signal is output. The feedback capacitor Cfb may be electrically connected to the first input port IN1 and the output port OUT of the operation amplifier OP-AMP. The reset switch SW_RST may control the first input port IN1 and the output port OUT of the operation amplifier OP-AMP to be connected to or disconnected from each other.

Hereinafter, the sensing skip processing for skipping the sensing processing on some signal segments of the pen signal PENS will be described.

First, as first sensing skip processing, some signal segments of the pen signal PENS may be skipped by on-off control of the reset switch SW_RST.

Describing in more detail, the sensing circuit 2110 may perform the sensing processing on the entire signal segments of the pen signal PENS or may skip the sensing processing on some signal segments of the entire signal segments of the pen signal PENS while performing the sensing processing on the remaining signal segments, depending on whether the switch SW_RST is on or off.

In a case in which the switch SW_RST is turned on, the sensing circuit 2110 may perform the sensing skip processing by skipping the sensing processing on some signal segments of the pen signal PENS while performing the sensing processing on the remaining signal segments.

The on-off control of the switch SW_RST may be performed by one of the sensing circuit 2110, the touch controller TCTR, and the display controller DCTR.

Next, as second sensing skip processing, some signal segments of the pen signal PENS may be skipped, depending on whether or not a second reference voltage VREF is supplied to the second input port IN2 of the operation amplifier OP-AMP.

Describing in more detail, the sensing circuit 2110 may perform the sensing processing on the entire signal segments of the pen signal PENS or may skip the sensing processing on some signal segments of the entire signal segments of the pen signal PENS while performing the sensing processing on the remaining signal segments, depending on whether the reference voltage VREF is supplied to the second input port IN2 of the operation amplifier OP-AMP.

The reference voltage VREF supplied to the second input port IN2 of the operation amplifier OP-AMP is a signal compared with a signal input to the first input port IN1 when a pen touch or a finger touch is detected. The reference voltage VREF may be the common voltage VCOM applied to the target common electrode Target CE to be sensed.

In a case in which the reference voltage VREF is not supplied to the second input port IN2 of the operation amplifier OP-AMP, the sensing circuit 2110 may perform the sensing skip processing by skipping the sensing processing on some signal segments of the entire signal segments of the pen signal PENS while performing the sensing processing on the remaining signal segments.

The sensing circuit 2110 may further include a masking switch SW_MASK to control the supply of the reference voltage VREF to the second input port IN2 of the operation amplifier OP-AMP.

The masking switch SW_MASK may be located outside of the sensing circuit 2110. For example, the masking switch SW_MASK may be disposed on a printed circuit or the display panel DISP, on which the touch driving circuit TDC may be mounted, or may be included inside of a reference voltage supply circuit.

During the pen touch sensing period simultaneous with the display driving, the sensing circuit 2110 may supply the common voltage VCOM having a constant voltage level to the plurality of common electrodes CE.

Figure 23:
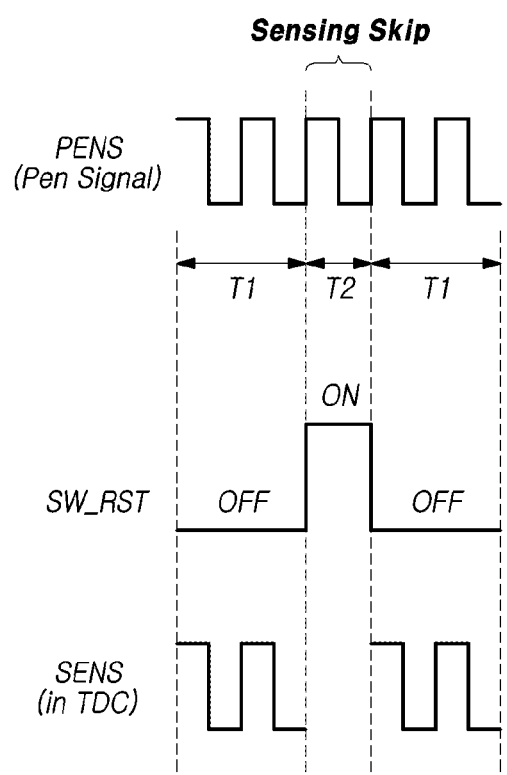
FIG. 23 is a diagram illustrating first sensing skip processing for pen touch sensing for removing or reducing panel interior noise in simultaneous driving of the touchscreen display device according to aspects.

FIG. 23 is a diagram illustrating the first sensing skip processing for the pen touch sensing for removing or reducing the panel interior noise PIN in the simultaneous driving of the touchscreen display device 100 according to aspects.

Referring to FIG. 23, the sensing circuit 2110 may perform the sensing processing on the entire signal segments of the pen signal PENS or may skip the sensing processing on some signal segments of the entire signal segments of the pen signal PENS while performing the sensing processing on the remaining signal segments, depending on whether the reset switch SW_RST is on or off.

Referring to FIG. 23, the sensing circuit 2110 may skip the sensing processing on specific signal segments of the pen signal PENS corresponding to a turn-on period T2 of the reset switch SW_RST by turning on the reset switch SW_RST.

Referring to FIG. 23, the sensing circuit 2110 performs the sensing processing on specific signal segments during a first period T1 in which the panel interior noise PIN is not predicted to occur by turning off the reset switch SW_RST during the first period T1.

Referring to FIG. 23, the sensing circuit 2110 skips the sensing processing on signal segments during a second period T2 in which the panel interior noise PIN is predicted to occur by turning on the reset switch SW_RST during the second period T2.

Figure 24:
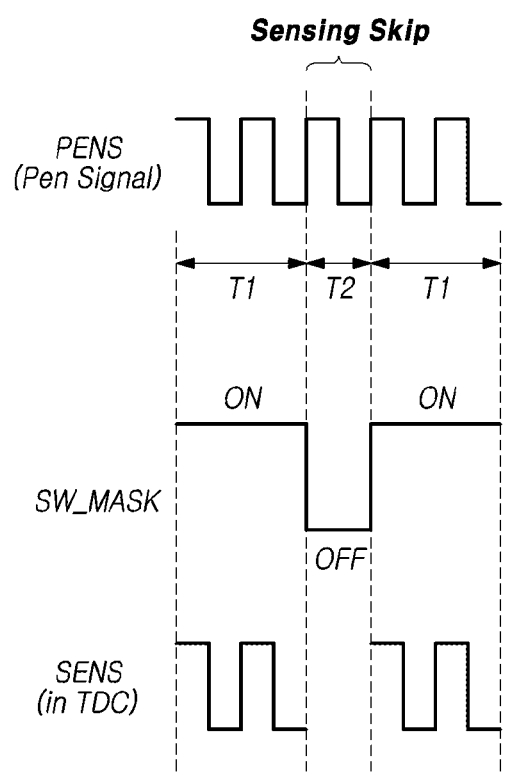
FIG. 24 is a diagram illustrating second sensing skip processing for pen touch sensing for removing or reducing panel interior noise in simultaneous driving of the touchscreen display device according to aspects.

FIG. 24 is a diagram illustrating the second sensing skip processing for the pen touch sensing for removing or reducing the panel interior noise PIN in the simultaneous driving of the touchscreen display device 100 according to aspects.

Referring to FIG. 24, the sensing circuit 2110 may perform the sensing processing on the entire signal segments of the pen signal PENS or may skip the sensing processing on some signal segments among the entire signal segments of the pen signal PENS while performing the sensing processing on the remaining signal segments, depending on whether or not the reference voltage VREF is supplied to the second input port IN2 of the operation amplifier OP-AMP.

Referring to FIG. 24, the sensing circuit 2110 may skip the sensing processing on the signal segments of the pen signal PENS corresponding to a period T2 in which the reference voltage VREF is not supplied to the second input port IN2 of the operation amplifier OP-AMP.

Referring to FIG. 24, the sensing circuit 2110 performs the sensing processing on signal segments during a first period T1 in which the panel interior noise PIN is not predicted to occur by turning on the mask switch SW_MASK during the first period T1.

Referring to FIG. 24, the sensing circuit 2110 skips the sensing processing on signal segments during the second period T2 in which the panel interior noise PIN is predicted to occur by turning off the mask switch SW_MASK during the second period T2.

Figure 25:
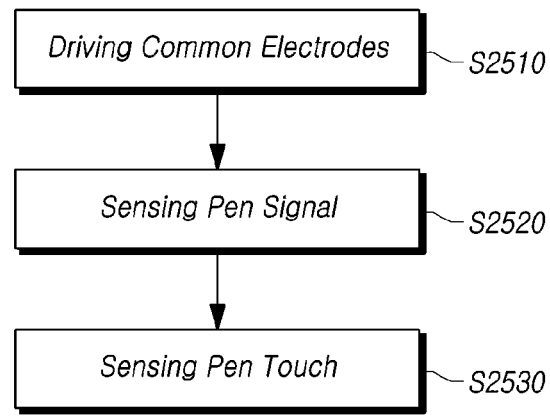
FIG. 25 is a flowchart illustrating the pen touch sensing method of the touchscreen display device according to aspects.

FIG. 25 is a flowchart illustrating the pen touch sensing method of the touchscreen display device 100 according to aspects.

Referring to FIG. 25, the pen touch sensing method of the touchscreen display device 100 according to aspects may include: driving step S2510 of driving the entirety or some of the plurality of common electrodes CE during the pen touch sensing period simultaneous with the display driving; pen signal sensing step S2520 of receiving the pen signal PENS output from the pen 200 through the target common electrode Target CE selected as a sensing target from among the plurality of common electrodes CE, performing the sensing processing on the pen signal PENS in a different manner, depending on whether or not the gate line GL through which the gate signal VGATE having a variable voltage level is applied overlaps with the target common electrode Target CE, and generating the sensing data according to the result of the sensing processing; and pen touch sensing step S2530 of detecting one or more of the position, tilt, and pen information of the pen 200 on the basis of the sensing data.

In the pen signal sensing step S2520, the touchscreen display device 100 may perform the sensing processing on the signal segments of the pen signal PENS or may skip the sensing processing on some signal segments among the signal segments of the pen signal PENS while performing the sensing processing on the remaining signal segments, depending on whether or not the gate line GL through which the gate signal VGATE having a variable voltage level is applied overlaps with the target common electrode Target CE.

In the pen signal sensing step S2520, in a case in which the gate line GL through which the gate signal VGATE having a variable voltage level is applied does not overlap with the target common electrode Target CE, the touchscreen display device 100 may perform the sensing processing on the signal segments of the pen signal PENS.

In the pen signal sensing step S2520, in a case in which the gate line GL through which the gate signal VGATE having a variable voltage level is applied overlaps with the target common electrode Target CE, the touchscreen display device 100 may skip the sensing processing on some signal segments among the signal segments of the pen signal PENS while performing the sensing processing on the remaining signal segments.

In the driving step S2510, the touchscreen display device 100 may supply the common voltage VCOM in the form of a DC voltage to the entirety or some of the plurality of common electrodes CE.

According to aspects, even in the case in which a pen touch is detected simultaneously with the display driving, high pen touch sensitivity may be obtained.

In addition, according to aspects, the pen touch sensing able to remove or reduce panel interior noise may be provided.

In addition, according to aspects, even in the case in which a change in the voltage occurs in the internal components, such as the data lines DL and the gate lines GL, in the display driving, and such a voltage change acts as noise in the touch sensors (or target common electrodes), a pen touch may be accurately detected.

In addition, according to aspects, even in the case in which a touch is detected during the display driving, the operation of displaying images may be properly performed without an effect due to the touch sensing.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touchscreen display device comprising:
a display panel including a plurality of data lines, a plurality of gate lines, and a plurality of common electrodes, wherein each common electrode among the plurality of common electrodes overlaps with one or more data lines among the plurality of data lines and one or more gate lines among the plurality of gate lines; and
a touch driving circuit, during a pen touch sensing period simultaneous with display driving, configured to drive all or some of the plurality of common electrodes, receive a pen signal output from a pen through a target common electrode selected as a sensing target from among the plurality of common electrodes, perform sensing processing on the pen signal in a different manner, depending on whether or not a gate line through which a gate signal having a variable voltage is applied, from among the plurality of gate lines, overlaps with the target common electrode; and generate and output sensing data according to a result of the sensing processing.

2. The touchscreen display device according to claim 1, wherein the touch driving circuit is configured to perform the sensing processing on signal segments of the pen signal or skips the sensing processing on some signal segments of the pen signal while performing the sensing processing on remaining signal segments of the pen signal, depending on whether or not the gate line through which the gate signal having a variable voltage is applied overlaps with the target common electrode.

3. The touchscreen display device according to claim 1, wherein the touch driving circuit is configured to perform the sensing processing on all of a plurality of pulses of the pen signal or skips the sensing processing on at least one pulse of the pen signal while performing the sensing processing on remaining pulses of the plurality of pulses of the pen signal, depending on whether or not the gate line through which the gate signal having a variable voltage is applied overlaps with the target common electrode.

4. The touchscreen display device according to claim 2, wherein the touch driving circuit is configured to perform the sensing processing on the remaining signal segments among the signal segments of the pen signal in a case in which the gate line through which the gate signal having a variable voltage is applied overlaps with the target common electrode, and perform the sensing processing on the signal segments of the pen signal in a case in which the gate line through which the gate signal having a variable voltage is applied does not overlap with the target common electrode.

5. The touchscreen display device according to claim 1, wherein, in a case in which the gate line through which the gate signal having a variable voltage is applied overlaps with the target common electrode, the target common electrode overlaps with a pixel electrode to which a data signal having a variable voltage is applied in order to display an image through a transistor turned on by the gate signal having a turn-on-level, and overlaps with a data line through which the data signal having a variable voltage is supplied in order to display the image.

6. The touchscreen display device according to claim 1, wherein, in a case in which the gate line through which the gate signal having a variable voltage is applied overlaps with the target common electrode, the target common electrode is in a state in which a voltage different from an intended common voltage is applied thereto, and
　in a case in which the gate line through which the gate signal having a variable voltage is applied does not overlap with the target common electrode, the target common electrode is in a state in which the intended common voltage is applied thereto.

7. The touchscreen display device according to claim 1, wherein a single display frame time includes the pen touch sensing period and a finger touch sensing period different from the pen touch sensing period,
　during the pen touch sensing period, a common voltage having a constant voltage level is applied to all or some of the plurality of common electrodes, and
　during the finger touch sensing period, a common voltage having a variable voltage level is applied to all or some of the plurality of common electrodes.

8. A touch driving circuit of a touchscreen display device, wherein the touchscreen display device includes a display panel including a plurality of data lines, a plurality of gate lines, and a plurality of common electrodes, wherein each common electrode among the plurality of common electrodes overlaps with one or more data lines among the plurality of data lines and one or more gate lines among the plurality of gate lines, the touch driving circuit comprising:
　a sensing circuit, wherein, during a pen touch sensing period simultaneous with display driving, the sensing circuit is configured to drive all or some of the plurality of common electrodes; receive a pen signal output from a pen through a target common electrode selected as a sensing target from among the plurality of common electrodes; and perform sensing processing on the pen signal in a different manner, depending on whether or not a gate line through which a gate signal having a variable voltage is applied, from among the plurality of gate lines, overlaps with the target common electrode; and
　an output circuit configured to generate and output sensing data according to a result of the sensing processing.

9. The touch driving circuit according to claim 8, wherein the sensing circuit is configured to perform the sensing processing on signal segments of the pen signal or skips the sensing processing on some signal segments of the pen signal while performing the sensing processing on remaining signal segments of the pen signal, depending on whether or not the gate line through which the gate signal having a variable voltage is applied overlaps with the target common electrode.

10. The touch driving circuit according to claim 9, wherein the sensing circuit is configured to perform the sensing processing on the remaining signal segments of the pen signal in a case in which the gate line through which the gate signal having a variable voltage is applied overlaps with the target common electrode, and perform the sensing processing on the signal segments of the pen signal in a case in which the gate line through which the gate signal having a variable voltage is applied does not overlap with the target common electrode.

11. The touch driving circuit according to claim 8, wherein the sensing circuit includes:
　an operation amplifier including a first input port electrically connected to the target common electrode, a second input port through which a reference voltage is input, and an output port through which an output signal is output;
　a capacitor electrically connected to the first input port and the output port; and
　a reset switch controlling a connection between the first input port and the output port,
　wherein the sensing circuit is configured to perform sensing processing on all of signal segments of the pen signal or skips the sensing processing on some of the signal segments of the pen signal while performing the sensing processing on remaining signal segments of the pen signal, depending on whether the reset switch is on or off.

12. The touch driving circuit according to claim 11, wherein the sensing circuit is configured to skip the sensing processing on a signal segment of the pen signal corresponding to a turn-on period of the reset switch by turning on the reset switch.

13. The touch driving circuit according to claim 8, wherein the sensing circuit includes:
　an operation amplifier including a first input port electrically connected to the target common electrode, a second input port through which a reference voltage is input, and an output port through which an output signal is output;
　a capacitor electrically connected to the first input port and the output port; and
　a reset switch controlling a connection between the first input port and the output port,
　wherein the sensing circuit is configured to perform sensing processing on all of signal segments of the pen signal or skips the sensing processing on some of the signal segments of the pen signal while performing the sensing processing on remaining signal segments of the pen signal, depending on whether or not the reference voltage is supplied to the second input port.

14. The touch driving circuit according to claim 13, wherein the sensing circuit skips the sensing processing on a signal segment of the pen signal corresponding to a period in which the reference voltage is not supplied to the second input port.

15. The touch driving circuit according to claim 8, wherein the sensing circuit is configured to supply a common voltage having a constant voltage level to the plurality of common electrodes during the pen touch sensing period simultaneous with the display driving.

16. The touch driving circuit according to claim 8, further including:
　a first multiplexer circuit configured to select the target common electrode among the plurality of common electrodes; and
　a second multiplexer circuit configured to select a sensing unit among a plurality of sensing units included in the sensing circuit, and output a signal stored within the selected sensing unit and serving to generate a sensing value to be included in the sensing data.

17. A pen touch sensing method of a touchscreen display device, wherein the touchscreen display device includes a display panel including a plurality of data lines, a plurality of gate lines, and a plurality of common electrodes, wherein each common electrode among the plurality of common electrodes overlaps with one or more data lines among the plurality of data lines and one or more gate lines among the plurality of gate lines, the pen touch sensing method comprising:

driving all or some of the plurality of common electrodes during a pen touch sensing period simultaneous with display driving;

sensing a pen signal by receiving the pen signal output from a pen through a target common electrode selected as a sensing target from among the plurality of common electrodes, performing sensing processing on the pen signal in a different manner, depending on whether or not a gate line through which a gate signal having a variable voltage level is applied, from among the plurality of gate lines, overlaps with the target common electrode, and generating sensing data according to a result of the sensing processing; and detecting one or more of a position, a tilt, and pen information of the pen in accordance with the sensing data.

18. The pen touch sensing method according to claim 17, wherein, in the sensing of the pen signal, the touchscreen display device performs the sensing processing on signal segments of the pen signal or skips the sensing processing on some signal segments of the pen signal while performing the sensing processing on remaining signal segments of the pen signal, depending on whether or not the gate line through which the gate signal having a variable voltage is applied overlaps with the target common electrode.

19. The pen touch sensing method according to claim 18, in the sensing of the pen signal, the touchscreen display device performs the sensing processing on the remaining signal segments among the signal segments of the pen signal in a case in which the gate line through which the gate signal having a variable voltage is applied overlaps with the target common electrode, and performs the sensing processing on the signal segments of the pen signal in a case in which the gate line through which the gate signal having a variable voltage is applied does not overlap with the target common electrode.

20. The pen touch sensing method according to claim 17, wherein the driving of the plurality of common electrodes comprises supplying a common voltage having a form of a direct current voltage to the plurality of common electrodes.

* * * * *